US012307956B1

(12) United States Patent
Ni

(10) Patent No.: US 12,307,956 B1
(45) Date of Patent: May 20, 2025

(54) METHOD FOR ADJUSTING SCREEN BRIGHTNESS, APPARATUS FOR ADJUSTING SCREEN BRIGHTNESS AND COMPUTER DEVICE

(71) Applicant: Wuhan Tianma Micro-Electronics Co., Ltd., Wuhan (CN)

(72) Inventor: Yuanting Ni, Wuhan (CN)

(73) Assignee: Wuhan Tianma Micro-Electronics Co., Ltd., Wuhan (CN)

( * ) Notice: Subject to any disclaimer, the term of this patent is extended or adjusted under 35 U.S.C. 154(b) by 0 days.

(21) Appl. No.: 18/754,565

(22) Filed: Jun. 26, 2024

(30) Foreign Application Priority Data

Mar. 25, 2024 (CN) ......................... 202410346763.5

(51) Int. Cl.
*G09G 3/34* (2006.01)
*G09G 3/20* (2006.01)
*G09G 3/32* (2016.01)
*G09G 3/3225* (2016.01)

(52) U.S. Cl.
CPC ............ *G09G 3/32* (2013.01); *G09G 3/3225* (2013.01); *G09G 2320/0626* (2013.01); *G09G 2320/0673* (2013.01); *G09G 2360/16* (2013.01)

(58) Field of Classification Search
CPC ............................................ G09G 2340/0435
See application file for complete search history.

(56) References Cited

U.S. PATENT DOCUMENTS

2016/0189635 A1* 6/2016 Lee ..................... G09G 3/3291 345/77
2021/0097920 A1* 4/2021 Yu ....................... G09G 3/2007

* cited by examiner

*Primary Examiner* — Nan-Ying Yang
(74) *Attorney, Agent, or Firm* — Anova Law Group, PLLC

(57) ABSTRACT

A method and an apparatus for adjusting brightness of a screen and a computer device are provided. The method includes determining at least one target gamma bonding node group based on the sample screen; for the target to-be-adjusted screen, obtaining a first mapping function between the corresponding register value of the color channel of the target pixel when the reference fresh frequency is used as display conditions and the corresponding register value of the color channel of the target pixel when the target refresh frequency is used as display conditions according to the target gamma bonding node group; determining a calculated register value of the color channel of the target pixel under remaining gamma bonding nodes except the target gamma bonding node according to the first mapping function; and adjusting the display brightness of the target screen at the target refresh frequency according to the calculated register value.

15 Claims, 9 Drawing Sheets

METHOD FOR ADJUSTING SCREEN BRIGHTNESS, APPARATUS FOR ADJUSTING SCREEN BRIGHTNESS AND COMPUTER DEVICE

CROSS-REFERENCE TO RELATED APPLICATION

This application claims the priority of Chinese Patent Application No. 202410346763.5, filed on Mar. 25, 2024, the content of which is incorporated by reference in its entirety.

TECHNICAL FIELD

The present disclosure generally relates to the field of display technologies and, more particularly, relates to a method for adjusting screen brightness, an apparatus for adjusting screen brightness and a computer device.

BACKGROUND

With the development of display panel technologies, customers' demand for the frame frequency of the display panel is getting higher and higher. In different application scenarios, display panels need to show a variety of different refresh frequencies. To meet customers' needs for frame frequencies of display panels, in the manufacturing process of the display panel, it is necessary to adjust the brightness of different Bands and different gamma bonding nodes at different refresh frequencies. The existing method is to adjust the register value of each gamma bonding node of each Band at each refresh frequency for each display panel to adjust the brightness. This method is very inefficient and seriously affects the capacity planning and configuration of the production line. The present disclosed methods for adjusting the brightness of the screen, apparatus for adjusting the brightness of the screen and computer devices are direct to solve such a problem and other problems in the arts.

SUMMARY

One aspect of the present disclosure provides a method for adjusting brightness of a screen. The method includes determining corresponding at least one target gamma bonding node group based on a corresponding adjusted register value of a color channel of a sample pixel in a sample screen under different initial gamma bonding nodes and different refresh frequencies; for each target pixel in a target to-be-adjusted target screen, according to the corresponding adjusted register value of the color channel of the target pixel under different first combined display conditions, obtaining a first mapping function between a corresponding register value of the color channel of the target pixel when a reference refresh frequency is used as a display condition and a corresponding register value of the color channel of the target pixel when a target refresh frequency is used as the display condition, wherein a first combined display condition is obtained by combining target gamma nodes in the at least one gamma bonding node group and refresh frequencies of the reference refresh frequency and the target refresh frequency; for remaining gamma bonding nodes except the target gamma bonding nodes and according to the first mapping function and the adjusted register value of the color channel of the target pixel under the remaining gamma bonding nodes and the reference fresh frequency, determining a corresponding calculated register value of the color channel of the target pixel under the remaining gamma bonding nodes and the target refresh frequency; and according to the corresponding calculated register value of the color channel of the target pixel under the remaining gamma bonding nodes and the target refresh frequency, adjusting a display brightness of the target screen at the target refresh frequency.

Another aspect of the present disclosure includes an apparatus for adjusting brightness of a screen. The apparatus includes a first determination module configured to determine a corresponding at least one target gamma bonding node group based on a corresponding adjusted register value of a color channel of a sample pixel in the sample screen under different initial gamma bonding nodes and different refresh frequencies; an acquisition module configured to acquire, for each target pixel in a target to-be-adjusted screen and according to a corresponding adjusted register value of the color channel of the target pixel under different first combined display conditions, a first mapping function between a corresponding register value of the color channel of the target pixel when a reference refresh frequency is used as a display condition and a corresponding register value of the color channel of the target pixel when a target refresh frequency is used as a display condition, wherein the first combined display condition is obtained by combining the target gamma bonding node in the gamma bonding node group and refresh frequencies in the reference refresh frequency and the target refresh frequency; a second determination module configured to determine, for remaining gamma bonding nodes except the target gamma bonding node and according to the first mapping function and the corresponding adjusted register value of the color channel of the target pixel under the remaining gamma bonding nodes and the reference refresh frequency, a corresponding calculated register value of the color channel of the target pixel under the remaining gamma bonding nodes and the target refresh frequency; and an adjustment module configured to adjust the display brightness of the target screen at the target refresh frequency according to the corresponding calculated register value of the color channel of the target pixel under the remaining gamma bonding nodes and the target refresh frequency.

Another aspect of the present disclosure includes a computer device. The computer device includes a memory configured to store computer program; and a processor configured to execute the computer program to determine corresponding at least one target gamma bonding node group based on corresponding adjusted register values of a color channel of a sample pixel in a sample screen under different initial gamma bonding nodes and different refresh frequencies; for each target pixel in a target to-be-adjusted target screen, according to the corresponding adjusted register value of the color channel of the target pixel under different first combined display conditions, obtain a first mapping function between a corresponding register value of the color channel of the target pixel when a reference refresh frequency is used as a display condition and a corresponding register value of the color channel of the target pixel when a target refresh frequency is used as the display condition, wherein a first combined display condition is obtained by combining target gamma nodes in the at least one gamma bonding node group and refresh frequencies of the reference refresh frequency and the target refresh frequency; for remaining gamma bonding nodes except the target gamma bonding nodes and according to the first mapping function and the adjusted register value of the color channel of the target pixel under the remaining gamma bonding nodes and the reference fresh frequency, determined a corresponding calculated register value of the color channel of the target pixel under the remaining gamma bonding nodes and the target refresh frequency; and according to the corresponding calculated register value of the color channel of the target pixel under the remaining gamma bonding nodes and the target refresh frequency, adjust a display brightness of the target screen at the target refresh frequency.

Other aspects of the present disclosure can be understood by those skilled in the art in light of the description, the claims, and the drawings of the present disclosure.

BRIEF DESCRIPTION OF THE DRAWINGS

To illustrate the technical solutions in the embodiments of the present disclosure more clearly, the following briefly introduces the accompanying drawings used in the description of the embodiments. Obviously, the accompanying drawings in the following description are only some embodiments of the present disclosure, for those of ordinary skill in the art, other drawings can also be obtained from these drawings without creative effort.

DETAILED DESCRIPTION

To make the purpose, technical solutions and advantages of the present disclosure more clear, the present disclosure will be further described in detail below with reference to the drawings and embodiments. It should be understood that the specific embodiments described here are only used to explain the present disclosure and are not used to limit the present application.

Figure 1:
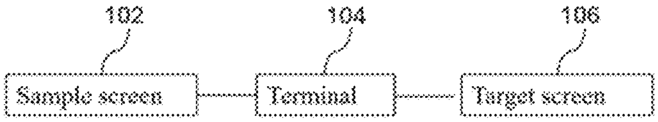
FIG. 1 illustrates an application environment of an exemplary method for adjusting the brightness of a screen according to various disclosed embodiments of the present disclosure.

The screen brightness adjustment method provided by the embodiments of the present disclosure may be applied in the application environment as shown in FIG. 1. As shown in FIG. 1, the terminal 104 may correspondingly adjust the calculated register values to determine the target gamma bonding node group based on the color channels of the sample pixels in the sample screen 102 under different initial gamma bonding nodes and different refresh frequencies, and determine the corresponding calculated register value of the color channel of the target pixel 106 under the remaining gamma bonding node and the target refresh frequency based on the target gamma bonding node group. Finally, the brightness of the target screen 106 may be adjusted according to the calculated register value. The sample screen 102 and the target screen 106 may include a display panel and a cover. The display panel may be an OLED display panel or a MicroLED display panel. The terminal 104 may be, but not limited to, various personal computers, notebook computers, smart phones, or tablet computers.

Figure 2:
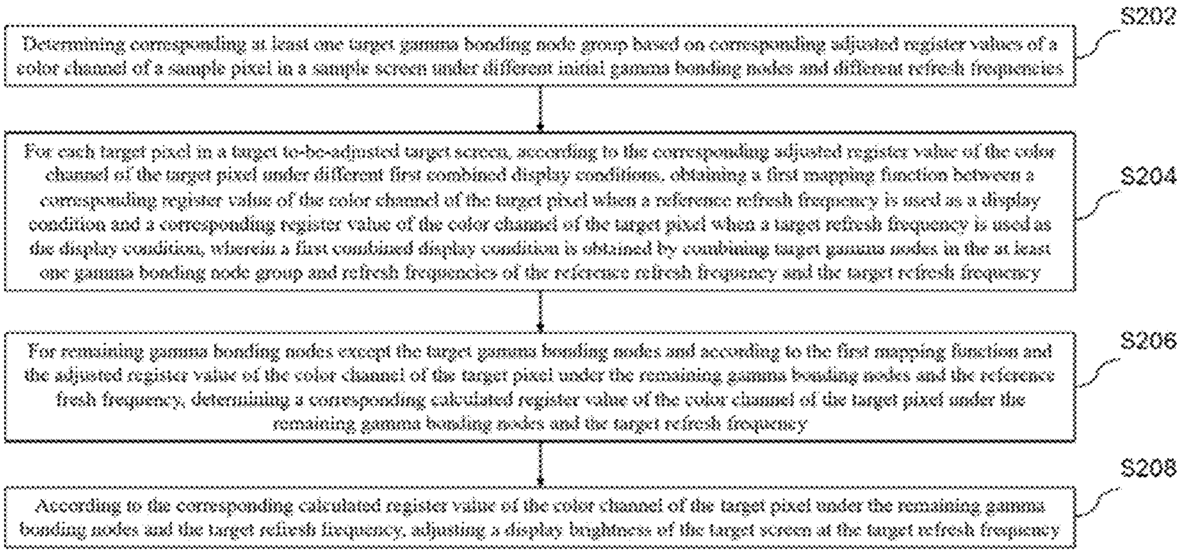
FIG. 2 illustrates a flow chart of an exemplary method for adjusting the brightness of a screen according to various disclosed embodiments of the present disclosure.

FIG. 2 illustrates a flow chart of an exemplary method for adjusting the brightness of a screen according to various disclosed embodiments of the present disclosure. This method is explained by taking the method applied to the terminal in FIG. 1 as an example. As shown in FIG. 2, the method may include the following steps 202 to 208.

The step S202 may include determining corresponding at least one target gamma bonding node group based on the corresponding adjusted register values of the color channels of the sample pixels in the sample screen under different initial gamma bonding nodes and different refresh frequencies.

The target gamma bonding node group determined based on the sample screen may be used for screens of the same model as the sample screen. The sample pixels may be referred to as the pixels in the sample screen, and each pixel may include a red (R) channel, a green (G) channel and a blue (B) channel. The gamma bonding nodes may include multiple specific grayscales among the grayscales supported by the integrated circuit of the screen. The initial gamma bonding node (Gamma Node) may be supported by the integrated circuit of the sample screen. There are multiple gamma bonding nodes among the supported gamma bonding nodes. As shown in Table 1, the integrated circuit of the sample screen may support a total of 20 gamma bonding nodes. The initial gamma bonding nodes may include the 17 gamma bonding nodes selected from the 20 gamma bonding nodes. The initial gamma bonding nodes of the same model of screen may be same. Each refresh frequency may correspond to multiple Bands, and the Bands corresponding to different refresh frequencies of a same screen may be same, and the Bands of different screens of the same model may be also the same. Under each Band of each refresh frequency, the register value of each grayscale of each pixel may be different. For example, the sample screen may include a total of 10 Bands, and Table 1 shows the values of the register corresponding to the Band 3. The adjusted register value may refer to the register value obtained by adjusting the register value of the color channel of the pixel after changing the refresh frequency of the screen. As shown in Table 1, the register value may be 1033 when the refresh frequency of the R channel is at 120 Hz, Band3 and under gamma bonding node15. The target gamma bonding node group may be a combination of multiple initial gamma bonding nodes. As shown in Table 1, the initial gamma bonding nodes 5, 7, and 15 may form one target gamma bonding node group, the initial gamma bonding nodes 23, 31, 47, 63, 79, 111, 143, 175, 191, 207, 239, 255 may form another target gamma bonding node group. To avoid affecting optical visual effects of the screen the number of initial gamma bonding nodes in the target gamma bonding node group shall not be greater than a preset number. For example, the preset number may be 12.

Returning to FIG. 2, the step S204 of the method for adjusting the brightness of the screen may include obtaining a first mapping function between the corresponding register value of the color channel of the target pixel when the reference refresh frequency is used as the display conditions and the corresponding register value of the color channel of the target pixel when the target fresh frequency is used as the display condition based on corresponding adjusted register values of the color channel of the target pixel under different first combined display conditions. The first combined display condition may be obtained by combining the target gamma bonding node in the target gamma bonding node group with the refresh frequencies in the reference refresh frequency and the target refresh frequency.

TABLE 1

| Band | | Band 3 | | | | | | | | | | | | | | | | |
|---|---|---|---|---|---|---|---|---|---|---|---|---|---|---|---|---|---|---|
| Gamma Node | | 1 | 3 | 5 | 7 | 15 | 23 | 31 | 47 | 63 | 79 | 111 | 143 | 175 | 191 | 207 | 239 | 255 |
| 120Hz | R | 254 | 763 | 798 | 832 | 1033 | 1157 | 1257 | 1412 | 1533 | 1633 | 1804 | 1944 | 2067 | 2123 | 2181 | 2288 | 2339 |
| | G | 243 | 729 | 755 | 776 | 922 | 1033 | 1125 | 1274 | 1391 | 1489 | 1648 | 1780 | 1894 | 1944 | 1992 | 2086 | 2128 |
| | B | 318 | 954 | 983 | 1008 | 1198 | 1318 | 1418 | 1590 | 1727 | 1840 | 2030 | 2187 | 2329 | 2392 | 2452 | 2574 | 2631 |
| | 120Hz_ΔR | | 509 | 35 | 34 | 201 | 124 | 100 | 155 | 121 | 100 | 171 | 140 | 123 | 56 | 58 | 107 | 51 |
| | 60Hz_ΔR | | 458 | 39 | 47 | 248 | 131 | 104 | 158 | 123 | 102 | 171 | 140 | 126 | 54 | 54 | 110 | 51 |
| | Δk | | 0.8998 | 1.1143 | 1.3824 | 1.2338 | 1.0565 | 1.04 | 1.0194 | 1.0165 | 1.02 | 1 | 1 | 1.0244 | 0.9643 | 0.931 | 1.028 | 1 |
| 60Hz | R | 229 | 687 | 726 | 773 | 1021 | 1152 | 1256 | 1414 | 1537 | 1639 | 1810 | 1950 | 2076 | 2130 | 2184 | 2294 | 2345 |
| | G | 217 | 652 | 687 | 712 | 894 | 1018 | 1117 | 1272 | 1391 | 1490 | 1651 | 1783 | 1897 | 1949 | 1998 | 2091 | 2135 |
| | B | 290 | 871 | 908 | 943 | 1181 | 1312 | 1419 | 1592 | 1730 | 1845 | 2036 | 2193 | 2335 | 2400 | 2462 | 2582 | 2638 |
| | R | | | 726 | 769 | 1021 | 1152 | 1253 | 1409 | 1531 | 1632 | 1085 | 1946 | 2070 | 2127 | 2186 | 2294 | 2345 |
| | G | | | 687 | 713 | 894 | 1018 | 1112 | 1264 | 1383 | 1483 | 1645 | 1780 | 1896 | 1947 | 1996 | 2092 | 2135 |
| | B | | | 908 | 940 | 1181 | 1312 | 1413 | 1587 | 1725 | 1839 | 2031 | 2190 | 2333 | 2397 | 2457 | 2580 | 2638 |
| | ΔR | | | 0 | -4 | 0 | 0 | -3 | -5 | -6 | -7 | -5 | -4 | -6 | -3 | 2 | 0 | 0 |
| | ΔG | | | 0 | 1 | 0 | 0 | -5 | -8 | -8 | -7 | -6 | -3 | -1 | -2 | -2 | 1 | 0 |
| | ΔB | | | 0 | -3 | 0 | 0 | -6 | -5 | -5 | -6 | -5 | -3 | -2 | -3 | -5 | -2 | 0 |

The target screen and the sample screen may be screens of a same model. The target pixel may refer to the pixel point in the target screen. The reference refresh frequency may be a refresh frequency selected from all possible refresh frequencies of the target screen. Different screens of the same model may select the same reference refresh frequency. For the reference refresh frequency, under different Bands and different initial gamma bonding nodes, the corresponding adjusted register value of each color channel of each pixel may be obtained through an adjustment. For example, 120 Hz in Table 1 may be the reference refresh frequency; and the target refresh frequency may be the remaining refresh frequencies among all possible refresh frequencies of the target screen except the reference refresh frequency. For the target screen, the target refresh frequency may only be adjusted under the target gamma bonding node to obtain the corresponding adjusted register value, the register value under the remaining gamma bonding nodes except the target gamma bonding node may be calculated based on the adjusted register value corresponding to the reference refresh frequency. For example, 60 Hz in Table 1 may be a target refresh frequency. The target gamma bonding node may include the maximum gamma bonding node and the minimum gamma bonding node in the target gamma bonding node group. In other embodiments, the target gamma bonding node may also be other gamma bonding nodes in the target gamma bonding node group. The gamma bonding node is not specifically limited in the embodiments of this disclosure.

Specifically, the first mapping function may be for each color channel of each target pixel in the target screen, and may be determined based on the adjusted register value of the color channel under the target gamma bonding node and the base refresh frequency and the adjusted register value of the color channel under the target gamma bonding node and the target refresh frequency.

Further, returning to FIG. 8, the step S206 of the method for adjusting the brightness of the screen may include, for the remaining gamma bonding nodes except the target gamma bonding nodes, determining the corresponding calculated register value of the color channel of the target pixel under the remaining gamma bonding nodes and the target refresh frequency according to the first mapping function and the corresponding adjusted register value of the color channel of the target pixel under the remaining gamma bonding nodes and the reference refresh frequency.

Specifically, for the remaining gamma bonding nodes in the target gamma bonding node group, the corresponding adjusted register value of each color channel of each target pixel under the remaining gamma bonding nodes and the reference refresh frequency may be substituted into the corresponding first mapping function, the calculated register value of each color channel of each target pixel under the remaining gamma bonding nodes and the target refresh frequency may be obtained by calculation.

Further, returning to FIG. 2, the step S208 of the method for adjusting the brightness of the screen may include adjusting the display brightness of the target screen at the target refresh frequency according to the corresponding calculated register value of the color channel of the target pixel under the remaining gamma bonding nodes and the target refresh frequency.

For each color channel of each target pixel of the target screen, if one wants to adjust the corresponding brightness of the color channel at the target refresh frequency, the register values of the color channel at all grayscales may need to be determined. All grayscales may include the target gamma bonding nodes, the remaining gamma bonding nodes and other grayscales. Among them, the register value of the color channel under the target gamma bonding node may be the corresponding adjusted register value, and the register value of the color channel under the remaining gamma bonding nodes may be the corresponding calculated register values, and the register value of the color channel at other grayscales may be obtained by the integrated circuit through the calculation based on the adjusted register value of the color channel under the target gamma bonding node and the calculated register value of the color channel at the remaining gamma bonding nodes.

In the above screen brightness adjustment method, at least one target gamma bonding node group may be first determined based on the sample screen, and then for the target to-be-adjusted screen, the first mapping function between the corresponding register value of the color channel of the target pixel when the reference refresh frequency is used as the display condition and the corresponding register value of the color channel of the target pixel when the target refresh frequency is used as the display condition based on the target gamma bonding node group, and the calculated register value corresponding to the color channel of the target pixel under the remaining gamma bonding nodes except the target bonding node and the target refresh frequency may be obtained according to the first mapping function. At the last, the brightness of the target screen at the target refresh frequency may be adjusted according to the calculated register value. In such a way, in the process of adjusting the display brightness at each target refresh frequency, only the register value of the target gamma bonding nodes needs to be adjusted, and the register values of the remaining gamma bonding nodes may be obtained by calculation, which may effectively improve the production efficiency of the target screen, thereby reducing product manufacturing costs.

Figure 3:
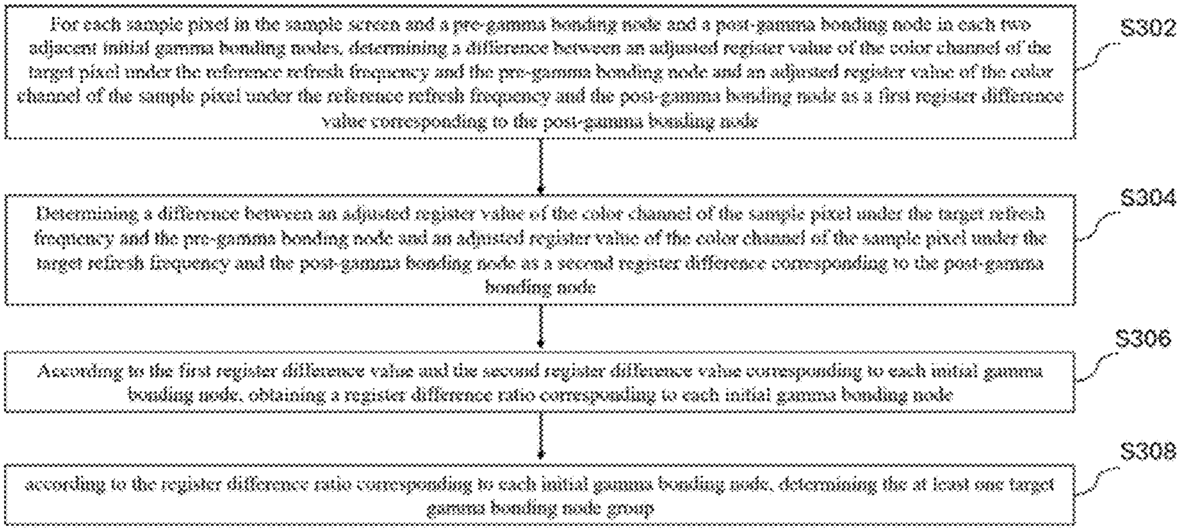
FIG. 3 illustrates a flow chart of an exemplary method for determining a first target gamma bonding point group according to various disclosed embodiments of the present disclosure.

In some embodiments, as shown in FIG. 3, different gamma bonding nodes may be sorted by size. The method for determining the corresponding at least one target gamma bonding node group based on the register value of the color channels of sample pixels in the sample screen under different initial gamma bonding nodes and different refresh frequencies may include:

S302: for each sample pixel in the sample screen and the pre-gamma bonding node and the post-gamma bonding node in each two adjacent initial gamma bonding nodes, using the difference between the adjusted register value of the color channel of the sample pixel under the pre-gamma bonding node and the reference refresh frequency and the adjusted register value under the reference refresh frequency and the post-gamma bonding node as a first register difference corresponding to the post-gamma bonding node;

S304: using the difference between the adjusted register value of the color channel of the sample pixel under the target refresh frequency and the pre-gamma bonding node and the adjusted register value of the color channel of the sample pixel under the target refresh frequency and the post-gamma bonding node as the second register difference corresponding to the post-gamma bonding node;

S306: obtaining the register difference ratio corresponding to each initial gamma bonding node according to the first register difference value and the second register difference value corresponding to each initial gamma bonding node; and S308: determining at least one target gamma bonding node group according to the register difference ratio corresponding to each initial gamma bonding node.

Because the target gamma bonding node group under the corresponding target refresh frequency may be determined based on the adjusted register value of the sample screen under the reference refresh frequency and the adjusted register value of the sample screen under the target refresh frequency, it may be necessary to determine the adjusted register value of the sample screen under each target refresh frequency. The register difference ratio may be the ratio between the second register difference value and the corresponding first register difference value.

Specifically, 120 Hz in Table 1 may be the reference refresh frequency, and 60 Hz may be the target refresh frequency. The row data corresponding to the R channel, G channel and B channel corresponding to 120 Hz in Table 1 may be the adjusted register value of each color channel of a certain pixel in the sample screen at 120 Hz. The row data corresponding to the first three rows of R channel, G channel and B corresponding to 60 Hz may be the adjusted register value of each color channel of a certain pixel in the sample screen under 60 Hz. The register difference value of the first register under the R channel may be the row data corresponding to 120 HZ_ΔR in Table 1. The register difference value of the second register under the R channel may be the row data corresponding to 60 HZ_ΔR in Table 1. For example, the gamma bonding node 5 and the gamma bonding node 7 may be the pre-gamma bonding node and the post-gamma bonding node respectively. The register value of the R channel at 120 Hz and the gamma bonding node 5 may be 798. The register value of the R channel at the gamma bonding node 7 may be 832. The corresponding first register difference of the gamma bonding node 7 under the R channel may be 34. The register value of the R channel at 60 Hz and the gamma bonding node 5 may be 726. The register value of the R channel at 60 Hz and the gamma bonding node 7 may be 773. The corresponding second register difference of the gamma bonding node 7 under the R channel may be 47. Using the same method, the first register difference and the second register difference of the gamma bonding node 7 under the G channel and the B channel may be determined. The row data corresponding to Δk in Table 1 may be the register difference ratio of each initial gamma bonding node under the R channel. For example, the corresponding register difference ratio of the gamma bonding node 7 under the R channel may be 1.3824. The register difference ratios of the gamma bonding node 7 under the G channel and the B channel respectively may also be calculated through the corresponding first register value and second register value.

Because the corresponding brightness of the gamma bonding node 1 in Table 1 may be too low, it may be impossible to accurately calculate the calculated register value of the target screen under different target refresh frequencies and gamma bonding nodes. Accordingly, in the process of adjusting the brightness of the target screen, the register value corresponding to gamma bonding node 1 may be obtained through adjustment, for example, there may be no need to determine the target gamma bonding node group corresponding to the gamma bonding node 1 based on the sample screen.

In one embodiment, by calculating the register difference ratio corresponding to each initial gamma bonding node, a foundation may be laid for the subsequent determination of the target gamma bonding node group.

Figure 4:
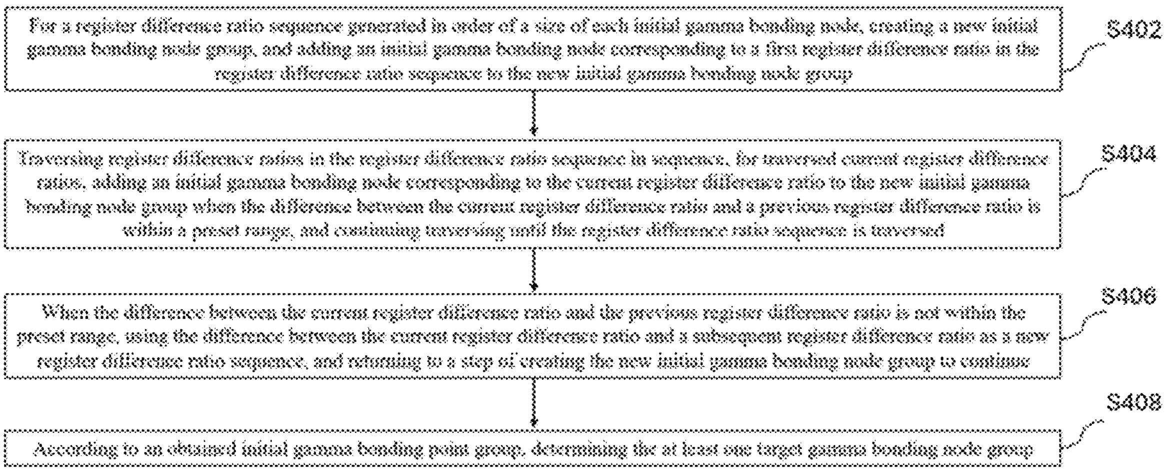
FIG. 4 illustrates a flow chart of an exemplary method for determining a second target gamma bonding point group according to various disclosed embodiments of the present disclosure.

In some embodiments, as shown in FIG. 4, the method for determining at least one target gamma bonding node group based on the register difference ratio corresponding to each initial gamma bonding node may include:

S402: creating a new initial gamma bonding node group according to the register difference ratio sequence generated in order of the size of each initial gamma bonding node, and adding the initial gamma bonding node corresponding to the first register difference ratio in the register difference ratio sequence to the new initial gamma bonding node group;

S404: traversing the register difference ratios in the register difference ratio sequence in sequence; adding the initial gamma bonding node corresponding to the current register difference ratio to the new initial gamma bonding group according to the traversed current register difference ratio and when the difference between the current register difference ratio and the previous register difference ratio is within a preset range; and continuing to traverse until the register difference ratio sequence is all traversed;

S406: using the current register difference ratio and the subsequent register difference ratio as the new register difference ratio sequence when the difference between the current register difference ratio and the previous register difference ratio is not within the preset range, and returning to the step of creating the new initial gamma bonding node group to continue; and S408: determining at least one target gamma bonding node group based on the obtained initial gamma bonding node group.

As shown in Table 1, according to the order of initial gamma bonding nodes from small to large, the corresponding register difference ratios of the gamma bonding nodes 3 to 255 in Table 1 under the R channel may be sorted to obtain the register difference ratio sequence. The gamma bonding node 3 may be included into an initial gamma bonding node group, and the difference between the register difference ratio corresponding to the gamma bonding node 5 and the register difference ratio corresponding to the gamma bonding node 3 may be calculated. If the difference is within the preset range, the gamma bonding node 5 may be included in the initial gamma bonding node group where gamma bonding node 3 is located. If the difference is not within the preset range, the gamma bonding node 3 may be included as a separate initial gamma bonding node group, and the gamma bonding node 5 may be incorporated into the new initial gamma bonding node group. The difference between the register difference ratio corresponding to the gamma bonding node 7 and the register difference ratio corresponding to gamma bonding node 5 may be calculated. If the difference is within the preset range, the gamma bonding node 7 may be included in the initial gamma bonding node group where the gamma bonding node 5 is located. If the difference is not within the preset range, the gamma bonding node 7 may be included in a new initial gamma bonding node group. The procedure may be repeated until the gamma bonding nodes 3 to 255 in Table 1 are all included in the initial gamma bonding node group. At the same time, in the G channel and B channel, the same method may also be used to include the gamma bonding nodes 3 to 255 in Table 1 into the corresponding initial gamma bonding node group. Due to the display characteristics of the screen, the initial gamma bonding node group determined finally in the R channel, G channel and B channel may be same.

In this embodiment, the initial gamma bonding node group may be determined based on the register difference ratio corresponding to each initial gamma bonding node, and the target gamma bonding node group may be determined based on the initial gamma bonding node group. Accordingly, the determined target gamma bonding node group may be more accurate.

Figure 5:
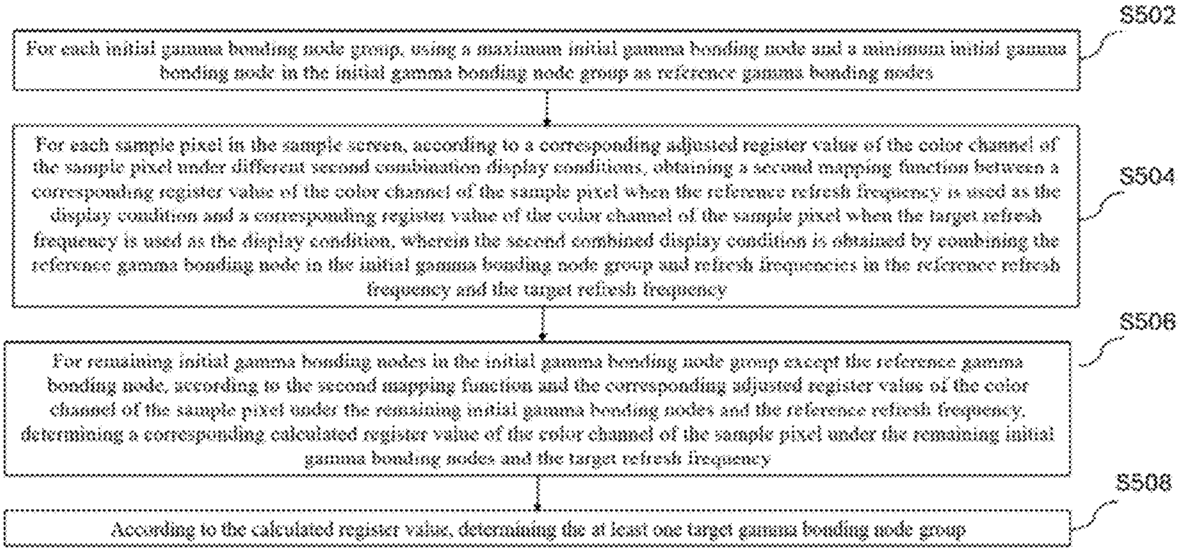
FIG. 5 illustrates a flow chart of an exemplary method for determining a third target gamma bonding point group according to various disclosed embodiments of the present disclosure.

In some embodiments, as shown in FIG. 5, the method for determining at least one target gamma bonding node group based on the obtained initial gamma bonding group may include:

S502: for each initial gamma binding point group, using the maximum initial gamma bonding node and the minimum initial gamma bonding group in the initial gamma bonding node group as the reference gamma bonding node;

S504: for each sample pixel in the sample screen, obtaining a second mapping function between the corresponding register value of the color channel of the sample pixel when the target refresh frequency is used as the display condition and the corresponding register value of the color channel of the sample pixel when the reference refresh frequency is used as the display condition according to the corresponding adjusted register value of the color channel of the sample pixel under different second combined display conditions. The second combined display condition may be obtained by combining the reference gamma bonding node in the initial gamma bonding node group with the refresh frequencies in the reference refresh frequency and the target refresh frequency;

S506: for the remaining initial gamma bonding nodes in the initial gamma bonding node group except the reference gamma bonding node, determining the corresponding calculated register value of the color channel of the sample pixel under the remaining initial gamma bonding nodes and the target refresh frequency according to the second mapping function and the adjusted register value of the color channel of the sample pixel under the remaining initial gamma bonding nodes and the reference refresh frequency; and

S508: determining at least one target gamma bonding node group based on the calculated register value.

Specifically, the second mapping function may be for each color channel of each sample pixel in the sample screen, may be determined based on the adjusted register value of the color channel at the reference gamma bonding point and the reference refresh frequency, and the adjusted register value of the color channel at the reference gamma bonding node and the target refresh frequency. For example, the gamma bonding nodes 3, 5, 7, and 15 in Table 1 may be in an initial gamma bonding node group, then the gamma bonding 3 and the gamma bonding node 15 may be the base gamma bonding nodes. As can be seen from Table 1, the corresponding adjusted register value under the gamma bonding node 3, the R channel and 120 Hz may be 763 Hz, the corresponding adjusted register value at the gamma bonding node 3, the R channel and 60 Hz may be 687 Hz, and the corresponding adjusted register value at the gamma bonding node 15, R channel and at 120 Hz may be 1033. The corresponding adjusted register value at the gamma bonding node 15, the R channel and 60 Hz may be 1021. Based on these 4 adjusted register values, the second mapping function of the initial gamma bonding node group under the R channel may be determined. After determining the second mapping function, the corresponding adjusted register value corresponding to the gamma bonding node 5 or the gamma bonding node 7 under the R channel and 120 Hz may be entered in the second mapping function, and the corresponding calculated register value of the gamma bond node 5 or the gamma bonding node 7 under the R channel and 60 Hz may be obtained. The last three rows of data corresponding to the R channel, the G channel and the B channel corresponding to 60 Hz in Table 1 may be the calculated register value of each color channel of a certain pixel of the sample screen at 60 Hz. At the same time, under the G channel and B channel, the same method may also be used to determine the corresponding second mapping function and the corresponding calculated register value of this initial gamma bonding node group.

In this embodiment, the calculated register value may be determined based on the second mapping function, and the target gamma bonding node group may be determined based on the calculated register value. Accordingly, the determined target gamma bonding node group may be more consistent with the need for the adjustment of the display brightness of the screen at different refresh frequencies.

In some embodiments, according to the corresponding adjusted register value of the color channel of the sample pixel under different second combined display conditions, the second mapping function between the corresponding register values of the color channel of the sample pixel when the target refresh frequency is used as the display condition may be determined, the method may include using the adjusted register value of the color channel of the sample pixel under the minimum reference gamma bonding node in the initial gamma bonding node group and the adjusted register value of the color channel of the sample pixel at the minimum reference gamma bonding node and the target refresh frequency as the first coordinate in the coordinate system. The horizontal and vertical axes of the coordinate system may respectively represent the register value at the reference refresh frequency and at the target refresh frequency. The method may also include using the adjusted register value of the color channel of the sample pixel under the maximum reference gamma bonding node in the initial gamma bonding node group and the reference refresh frequency and the adjusted register value of the color channel of the sample pixel at the maximum reference gamma bonding node and the target refresh frequency as a second coordinate in the coordinate system; and performing a curve fitting based on the first coordinate and the second coordinate to obtain the second mapping function between the register value corresponding to the color channel of the sample pixel when the reference refresh frequency is used as the display condition and the register value corresponding to the color channel of the sample pixel when the target refresh frequency is used as the display condition.

As shown in Table 1, in the initial gamma bonding node group composed of the gamma bonding nodes 3, 5, 7, and 15, the gamma bonding node 3 may be the minimum reference gamma bonding node, and the gamma bonding node 15 may be the maximum reference gamma bonding node. For the R channel, the corresponding adjusted register value at the gamma bonding node 3 and 120 Hz, and the corresponding adjusted register value at the gamma bonding node 3 and 60 Hz may be determined as the first coordinate, that is, the first coordinate may be (763, 687). The corresponding adjusted register value at the gamma bonding node 15 and 120 Hz and the corresponding adjusted register value at the gamma bonding node 15 and 60 Hz may be determined as the second coordinate, that is, the second coordinate may be (1033, 1021). A linear fitting may be performed on the first coordinate and the second coordinate, the second mapping function of the initial gamma bonding node group under the R channel may be obtained.

In Table 1, the gamma bonding node 23 to the gamma bonding node 255 may be another initial gamma bonding node group, and the gamma bonding node 23 and the gamma bonding node 255 may be the reference gamma bonding nodes in the gamma bonding node group. Using the same method, the second mapping functions of this initial gamma bonding node group under the R channel, the G channel and the B channel may be determined respectively. The second mapping functions under the R channel and the G channel are illustrated in FIG. 6 and FIG. 7.

In this embodiment, based on the adjusted register value of each color channel under different refresh frequencies and reference gamma bonding nodes, the second mapping function of each initial gamma bonding node group under each color channel may be calculated, and the calculated register value determined by the second mapping function may be more accurate.

In some embodiments, the method for determining at least one target gamma bonding node group based on the calculated register value may include: for each sample pixel in the sample screen, obtaining the difference between the adjusted register value and the calculated register value of the color channel of the sample pixel under each remaining initial gamma bonding node and the target refresh frequency; and determining the initial gamma bonding point as the target gamma bonding node group when the difference between the adjusted register value and the calculated register value is within a second preset difference range.

Figure 6:
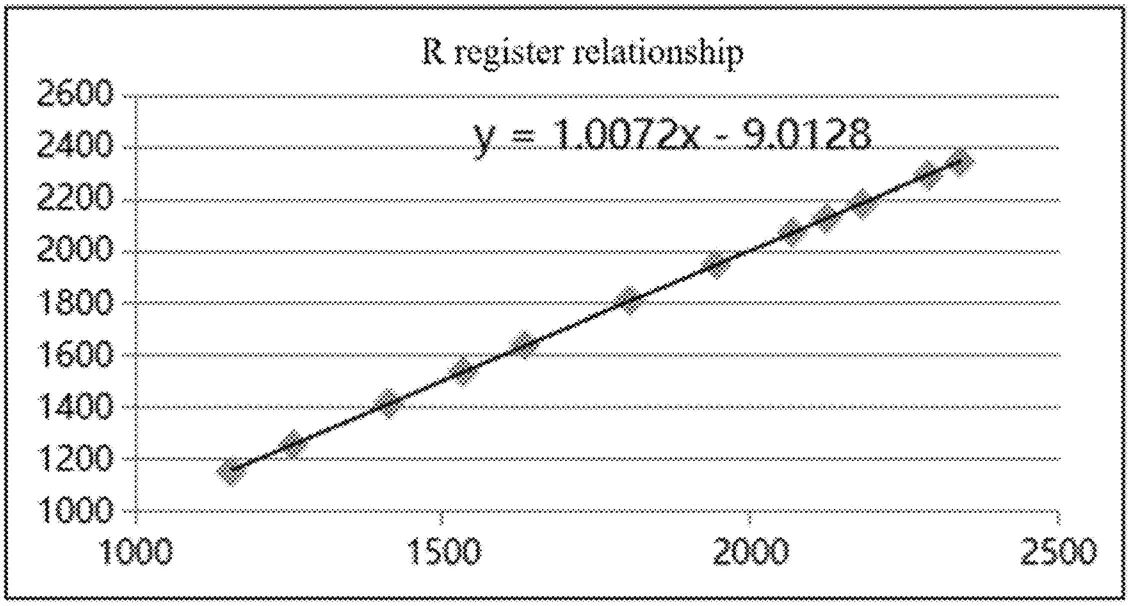
FIG. 6 illustrates an exemplary relationship of registers under the R channel according to various disclosed embodiments of the present disclosure.
Figure 7:
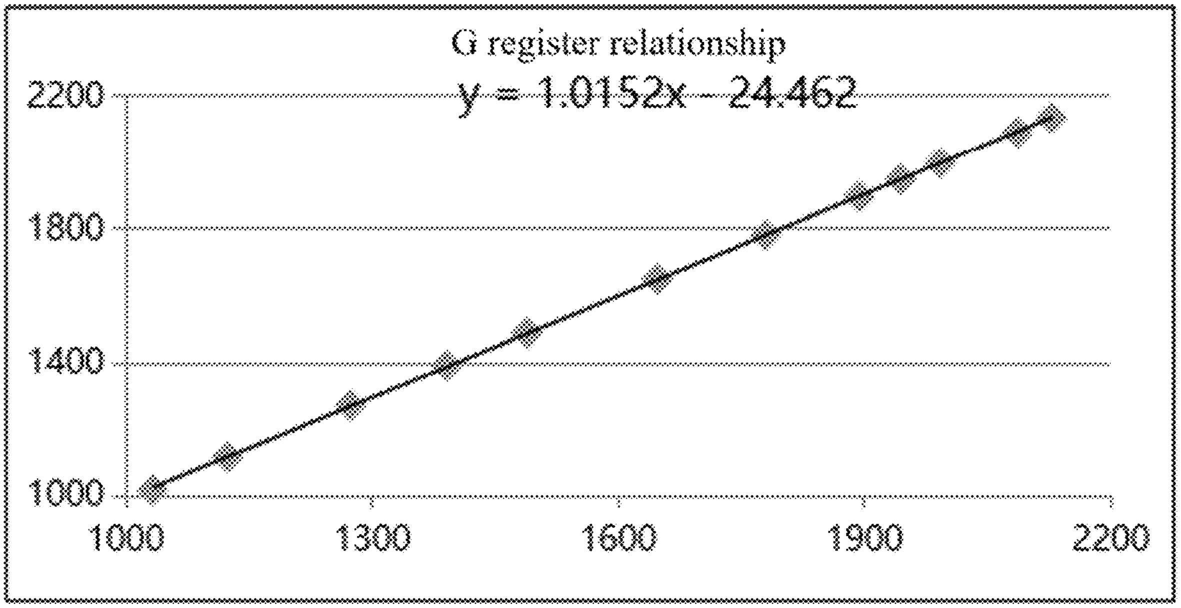
FIG. 7 illustrates an exemplary relationship of registers under the G channel according to various disclosed embodiments of the present disclosure.

As shown in Table 1, for the R channel and the initial gamma bonding group composed of the gamma bonding node 23 to the gamma bonding node 255, based on the corresponding second mapping function in FIG. 6, the calculated register value of each remaining initial gamma bonding node from the gamma bonding node 31 to the gamma bonding node 239 at 60 Hz may be determined. Similarly, the calculated register value of each gamma bonding node in the remaining initial gamma bonding node group in the G channel and the B channel at 60 Hz may be calculated. Then, the difference value between the adjusted register value and the calculated register value of each remaining initial gamma bonding node in each color channel and 60 Hz may be determined. The row data corresponding to ΔR, ΔG, and ΔB in Table 1 may be the difference value under each color channel, respectively. The second preset difference range may be greater than or equal to −10 and less than or equal to 10. It can be seen from the row data corresponding to ΔR, ΔG, and ΔB that all the difference values corresponding to the initial gamma bonding node group may be within the second preset difference range, the initial gamma bonding node point group consisting of the gamma bonding node 23 to the gamma bonding node 255 may be determined as a target gamma bonding node group, and the gamma bonding node 23 and the gamma bonding node 255 may be the target gamma bonding nodes in the target gamma bonding point group.

In this embodiment, only when the difference between the adjusted register value and the calculated register value is within the second preset difference range, the corresponding initial gamma bonding node group may be determined as the target gamma bonding node group, the target gamma bonding node group determined in this way may be more in line with the screen's adjustment requirements for display brightness at different refresh frequencies.

Figure 8:
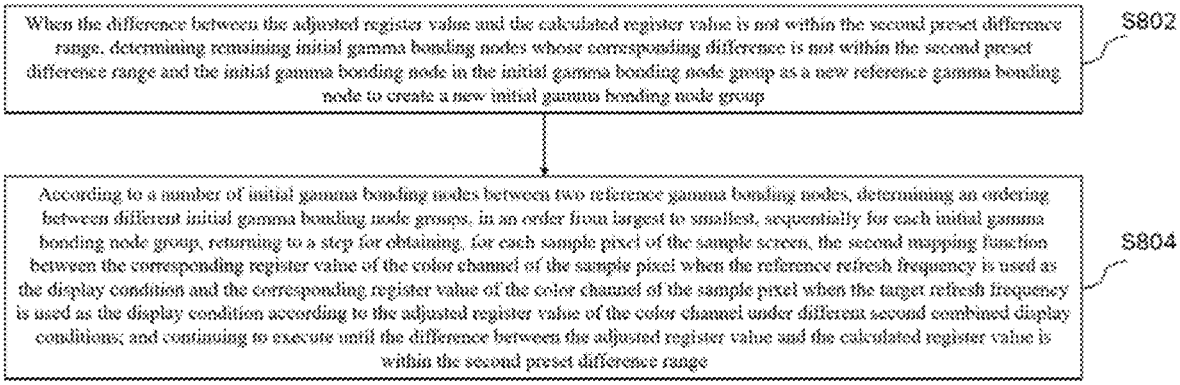
FIG. 8 illustrates a flow chart of an exemplary method for determining a fourth target gamma bonding point group according to various disclosed embodiments of the present disclosure.

In some embodiments, as shown in FIG. 8, the above method may further include:

S802: when the difference between the adjusted register value and the calculated register value is not within the second preset difference range, determining the remaining initial gamma bonding nodes whose corresponding differences are not within the second preset difference range and the initial gamma bonding node in the initial gamma bonding node group as a new reference gamma bonding nodes to create a new initial gamma bonding node group; and

S804: determining the order of different initial gamma bonding node groups according to the number of initial gamma bonding nodes spaced between the two reference gamma bonding nodes; in order from large to small, for each initial gamma node group, returning the step for obtaining the second mapping function between the corresponding register value of the color channel of the sample pixel when the reference refresh frequency is used as the display condition and the corresponding register value of the color channel of the sample pixel when the target refresh frequency is used as the display condition for each sample pixel of the sample screen and according to the adjusted register value of the color channel of the sample pixel under different second combined display conditions, and continue to execute the step until the differences between the adjusted register value and the calculated register value are both within the second preset difference range.

As shown in Table 1, for the initial gamma bonding node group composed of the gamma bonding node 23 to the gamma bonding node 255, if a difference between the adjusted register value and the calculated register value corresponding to the remaining initial gamma bonding node is not within the second preset difference range, the gamma bonding node 23 to the gamma bonding node 239 and the gamma binding node 31 to the gamma bonding node 255 may be respectively used as two new initial gamma bonding point groups, and the gamma bonding node 23 and the gamma bonding node 239 and the gamma bonding node 31 and the gamma bonding node 255 may be used as the reference gamma bonding nodes of the two groups respectively. For each new initial gamma bonding node group, whether the remaining initial gamma bonding nodes in each group satisfy the difference between the corresponding adjusted register value and the corresponding calculated register value are within the second preset difference range may be determined again. If the condition is not satisfied, the gamma bonding node 23 to the gamma bonding node 207, the gamma bonding node 31 to the gamma bonding node 239, and the gamma bonding node 47 to the gamma bonding node 255 may be used as three new initial gamma bonding point groups, and the gamma bonding node 23 and the gamma bonding node 207, the gamma bonding node 31 and the gamma bonding node 239, and the gamma bonding node 47 and the gamma bonding node 255 may respectively be used as the reference gamma bonding nodes of the three groups. The procedure may be repeated until the corresponding differences of all gamma bonding nodes from the gamma bonding node 23 to the gamma bonding node 255 are within the second preset difference range.

In one embodiment, when the difference between the adjusted register value and the calculated register value is not within the second preset difference range, a new initial gamma bonding node group may be re-determined, and the new initial gamma bonding node group may continue to be determined until the corresponding differences of all remaining initial gamma bonding nodes are within the second preset difference range. Accordingly, the determined target gamma bonding node group is more consistent with the adjustment needs of the display brightness of the screen at different refresh frequencies.

Figure 9:
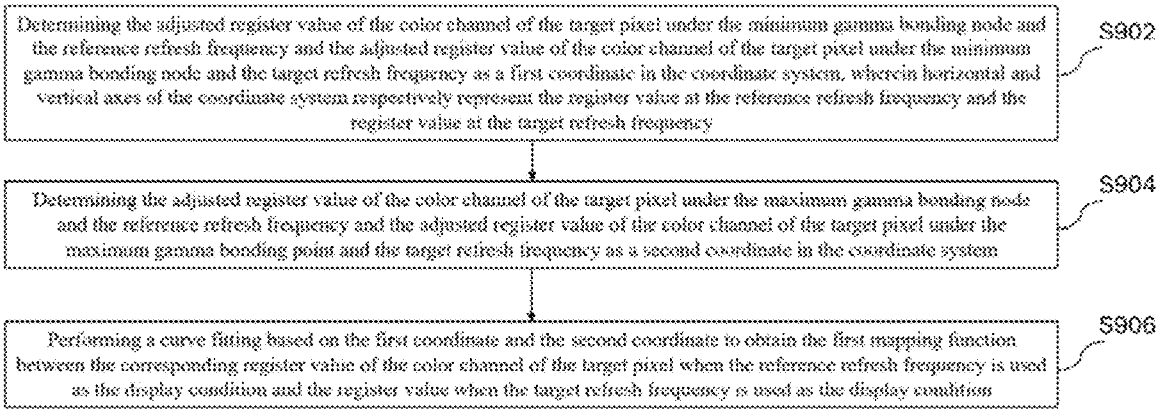
FIG. 9 illustrates a flow chart of an exemplary method for determining a first mapping function according to various disclosed embodiments of the present disclosure.

In some embodiments, as shown in FIG. 9, the target gamma bonding nodes may be the minimum gamma bonding node and the maximum gamma bonding node in the target gamma bonding node group. The first mapping function between the corresponding register value of the color channel of the target pixel when the reference refresh frequency is used as the display condition and the corresponding register value of the color channel of the target pixel when the target refresh frequency is used as the display condition may be determined according to the corresponding register value of the color channel of the target pixel under different first combined display conditions. The method for determining the first mapping function may include:

S902: using the adjusted register value of the color channel of the target pixel under the minimum gamma bonding node and the reference refresh frequency and the adjustment register value of the color channel of the target pixel under the minimum gamma binding point and the target refresh frequency as the first coordinate of the coordinate system. The horizontal and vertical axes of the coordinate system may respectively represent the register value under the reference refresh frequency and the register value at the target refresh frequency;

S904: using the adjusted register value of the color channel of the target pixel under the maximum gamma bonding node and the reference refresh frequency and the adjusted register value of the color channel of the target pixel under the maximum gamma bonding node and the target refresh frequency as the second coordinate of the coordinate system; and

S906: performing a curve fitting based on the first coordinate and the second coordinate to obtain the first mapping function between the corresponding register value of the color channel of the target pixel when the reference refresh frequency is used as the display condition and the corresponding register value of the color channel of the target pixel when the target refresh frequency is used as the display condition.

Among them, as shown in Table 1, the target gamma bonding node group finally determined based on the sample screen may include the gamma bonding node 3, the gamma bonding node 5 to the gamma bonding node 15, and the gamma bonding node 23 to the gamma bonding node 255 these 3 gamma bonding node groups. In the target gamma bonding node group from the gamma bonding node 23 to the gamma bonding node 255, the gamma bonding node 23 and the gamma bonding point 255 may be the minimum gamma bonding node and the maximum gamma bonding node respectively, and 120 Hz may be still used as the reference refresh frequency and 60 Hz may be used as the target refresh frequency of 60 Hz. For the R channel and the target screen, the corresponding adjusted register value under the gamma bonding node 23 and 120 Hz and the corresponding adjusted register value under the gamma bonding node 23 and 60 Hz may be determined as the first coordinate, and the corresponding adjusted register value under the gamma bonding node 255 and 120 Hz and the corresponding adjusted register value under the gamma bonding node 255 and 60 Hz may be determined as the second coordinate. By performing the linear fitting on the first coordinate and the second coordinate, the first mapping function of the target gamma bonding node group under the R channel may be obtained. Using the same method, for the target screen, the first mapping function corresponding to the target gamma bonding node group under the G channel and B channel may be calculated.

In this embodiment, based on the adjusted register value of each color channel under different refresh frequencies and target gamma node groups, the first mapping function of each target gamma bonding node group under each color channel may be calculated. The calculated register value based on the first mapping function may be more accurate.

Figure 10:
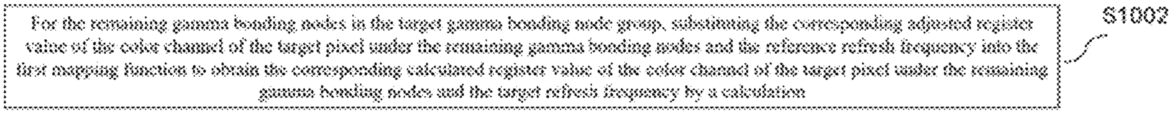
FIG. 10 illustrates a flow chart of an exemplary method for determining the value of the calculating register according to various disclosed embodiments of the present disclosure.

In some embodiments, as shown in FIG. 10, the method for determining the corresponding calculated register values of the color channel of the target pixel under the remaining gamma bonding nodes and target refresh frequency according to the first mapping function and the corresponding adjusted register value of the color channel of the target pixel under the remaining gamma bonding nodes and the reference refresh frequency may include:

S1002: for the remaining gamma bonding nodes in the target gamma bonding node group, substituting the corresponding adjusted register value of the color channel of the target pixel under the remaining gamma bonding nodes and the reference refresh frequency into the first mapping function to calculate the corresponding register value of the color channel of the target pixel under the remaining gamma bonding nodes and the target refresh frequency.

For example, in the target gamma bonding node group from the gamma bonding node 23 to the gamma bonding node 255, the adjusted register value of the gamma bonding node 111 in the R channel and 120 Hz may be substituted into the first mapping function of the target gamma bonding node under the R channel, and the calculated register value of the gamma bonding node 111 under the R channel and 60 Hz may be obtained.

In this embodiment, the calculated register value may be determined based on the first mapping function, the subsequent adjustment result of the brightness adjustment of the target screen at the target refresh frequency based on the calculated register value may be more accurate.

Figure 11:
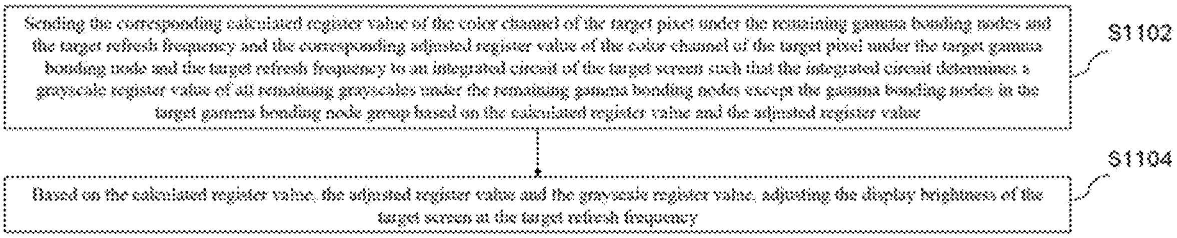
FIG. 11 illustrates a flow chart of another exemplary method for adjusting the brightness of a screen according to various disclosed embodiments of the present disclosure.

In some embodiments, as shown in FIG. 11, the method for adjusting the display brightness of the target screen at the target refresh frequency according to the corresponding calculated register value of the color channel of the target pixel under the remaining gamma bonding node and the target refresh frequency may include:

S1102: sending the corresponding calculated register value of the color channel of the target pixel under the remaining gamma bonding nodes and the reference refresh frequency and the corresponding adjusted register value of the color channel of the target pixel under the target gamma bonding nodes and the target refresh frequency to the integrated circuit of the target screen such that the integrated circuit may determine the grayscale register values of all remaining grayscales under the color channel except for the gamma bonding nodes in the target gamma bonding point group based on the calculated register value and the adjusted register value; and

S1104: adjusting the display brightness of the target screen at the target refresh frequency based on the calculated register value, the adjusted register value and the grayscale register value.

The integrated circuit may use a linear interpolation method to calculate the grayscale register value of the remaining grayscales under the color channel based on the calculated register value and the adjusted register value. For each target pixel, after determining the corresponding calculated register value, adjusted register value or the grayscale register value of each color channel under all grayscales, the Vdata voltage of the target pixel may be adjusted based on these register values, thereby adjusting the brightness of the target pixel, and finally achieve the purpose of adjusting the display brightness of the target screen.

In this embodiment, the grayscale register value of the remaining grayscales in the color channel may be calculated based on the calculated register value and the adjusted register value, and the display brightness of the target screen may be adjusted based on the calculated register value, the adjusted register value, and the grayscale register value, making the adjusted results of the display brightness more accurate.

Figure 12:
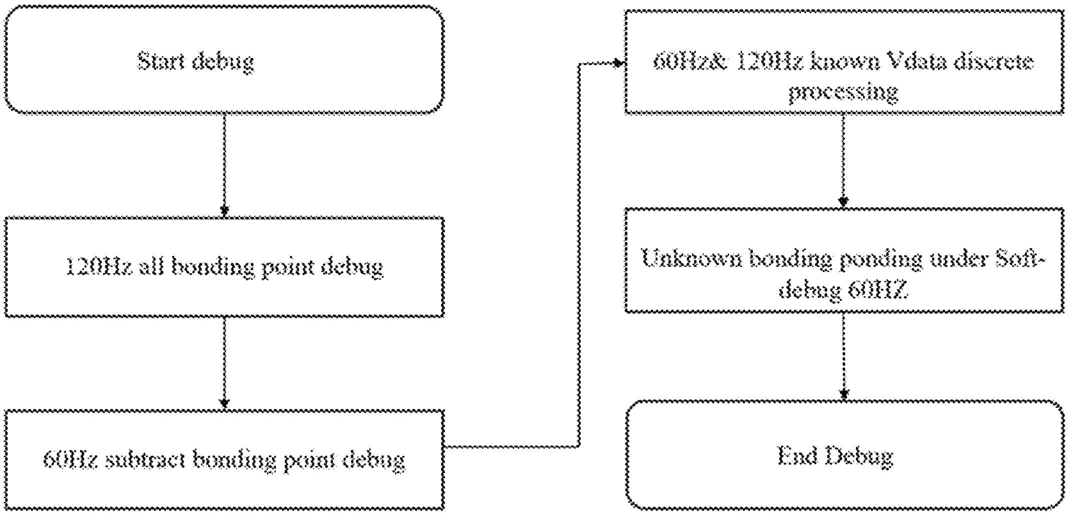
FIG. 12 illustrates a flow chart of another exemplary method for adjusting the brightness of a screen according to various disclosed embodiments of the present disclosure.

FIG. 12 illustrates a flowchart of another exemplary method for adjusting the screen brightness. As shown in FIG. 12, the method may be based on the refresh frequency of 120 Hz. At the 120 Hz refresh frequency, the register values of all gamma bonding nodes of all Bands may be obtained by adjusting, while at other refresh frequencies, only the register values of some gamma bonding nodes may be obtained by adjusting, and the register values of the remaining gamma bonding nodes may be calculated through the soft adjustment algorithm. The other refresh frequencies may include one of 48 Hz, 60 Hz and 90 Hz. The soft adjustment algorithm may be obtained by the Vdata discrete processing based on the register value adjusted at 120 Hz and the register value adjusted at other refresh frequencies. Finally, based on the register value adjusted at other refresh frequencies and the calculated register value, the brightness of the screen at other refresh frequencies may be adjusted.

Compared with the brightness adjustment method that adjusts the register value of each gamma bonding node of each Band at each refresh frequency, in this embodiment, only all gamma bonding nodes of the reference refresh frequency need to be adjusted, for other refresh frequencies, only the register values of some gamma bonding nodes need to be adjusted. In such an approach, compared with the existing method, the cost in the screen production process may be effectively reduced and no production line capacity planning may be affected.

Figure 13:
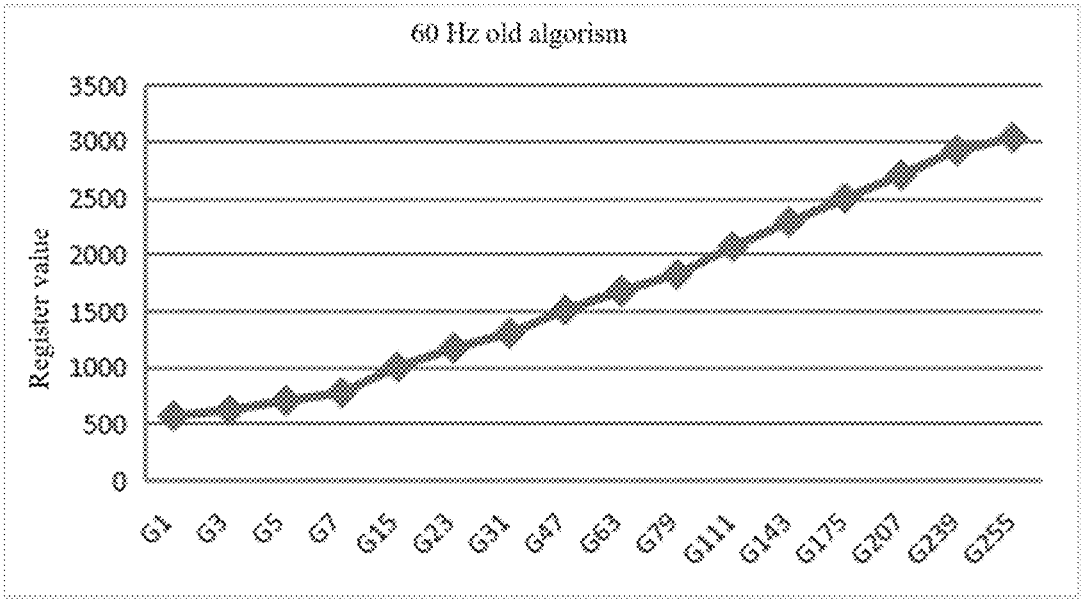
FIG. 13 illustrates an adjustment of the gamma bonding node at 60 Hz.
Figure 14:
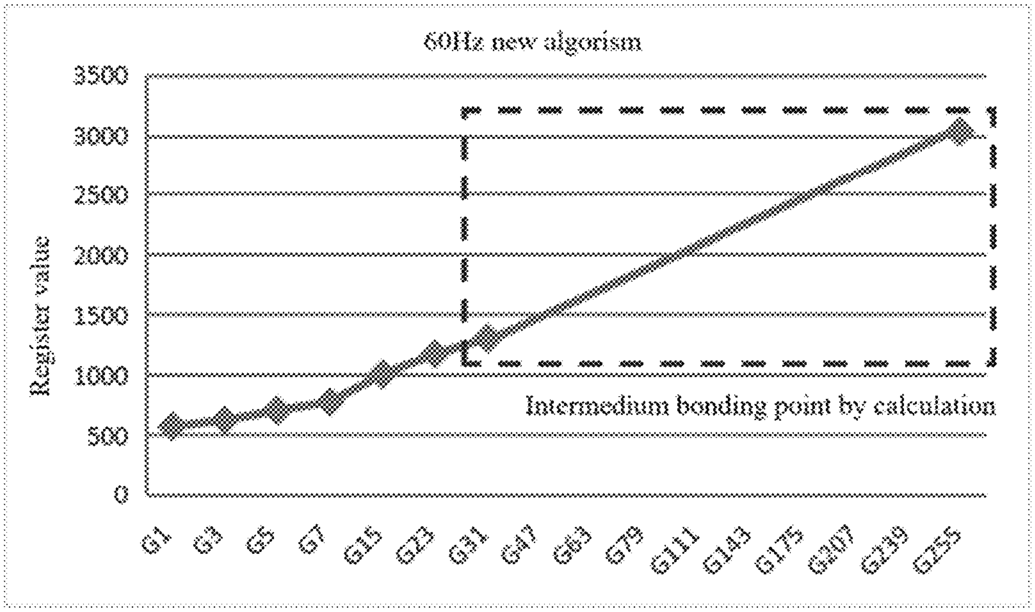
FIG. 14 illustrates an exemplary adjustment of the gamma bonding node at 60 Hz according to various disclosed embodiments of the present disclosure.

FIG. 13 is a schematic diagram of using the existing method to adjust each gamma bonding point when the other refresh frequency is 60 Hz. FIG. 14 illustrates the approach using the method in the embodiment to adjust the brightness: when the other refresh frequency is 60 Hz, only a portion of the gamma bonding nodes need to be adjusted, and the register values of the intermediate gamma bonding nodes may be obtained through calculation.

It should be understood that although the steps in the flowcharts involved in the above-mentioned embodiments are shown in sequence as indicated by the arrows, these steps are not necessarily executed in the order indicated by the arrows. Unless otherwise specified in this disclosure, there is no strict order restriction on the execution of these steps, and these steps can be executed in other orders. Moreover, at least some of the steps in the flowcharts involved in the above embodiments may include multiple steps or stages. These steps or stages are not necessarily executed at the same time, but may be completed at different times. The execution order of these steps or stages is not necessarily sequential but may be performed in turn or alternately with other steps or at least part of the steps or stages in other steps.

The present disclosure also provides an apparatus for adjusting the brightness of a screen by implementing the above-mentioned screen brightness adjustment method. The implementation solution provided by this apparatus to solve the problem is similar to the implementation solution recorded in the above method. Therefore, the specific limitations in the one or more screen brightness adjustment apparatus embodiments provided below may be found in the above description of the screen brightness adjustment method, the details will not be repeated here.

Figure 15:
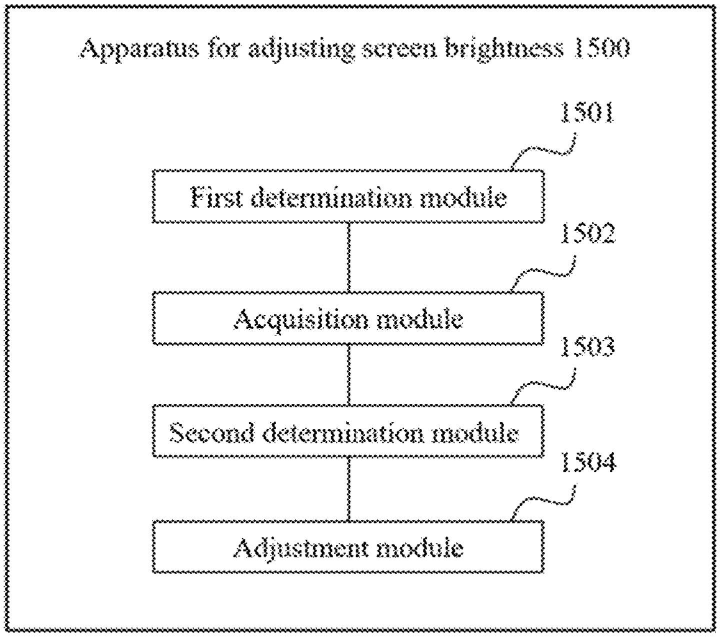
FIG. 15 illustrates an exemplary apparatus for adjusting display brightness according to various disclosed embodiments of the present disclosure.

FIG. 15 illustrates an exemplary apparatus for adjusting the brightness of a screen according to various disclosed embodiments of the present disclosure. As shown in FIG. 15, device 1500 may include a first determination module 1501, an acquisition module 1502, a second determination module 1503 and an adjustment module 1504.

The first determination module 1501 may be configured to determine the corresponding at least one target gamma bonding node group based on the corresponding adjusted register values of the color channels of the sample pixels in the sample screen under different initial gamma bonding nodes and different refresh frequencies.

The acquisition module 1502 may be configured to obtain, for each target to-be-adjusted pixel in the target screen, a first mapping function between the corresponding register value of the color channel of the target pixel when the reference refresh frequency is used as the display condition and the corresponding register value of the color channel of the target pixel when the target refresh frequency is used as the display condition according to the corresponding adjusted register value of the color channel of the target pixel under different first combined display conditions. The first combined display condition may be to combine the target gamma bonding node in the gamma bonding node group and the refresh frequencies in the reference refresh frequency and the target refresh frequency.

The second determination module 1503 may be configured to determine, for the remaining gamma bonding nodes except the target gamma bonding node, a corresponding calculated register value of the color channel of the target pixel under the remaining gamma bonding nodes and the target refresh frequency according to the first mapping function and the corresponding adjusted register value of the color channel of the target pixel under the remaining gamma bonding nodes and the reference fresh frequency.

The adjustment module 1504 may be configured to adjust the display brightness of the target screen at the target refresh frequency according to the corresponding calculated register value of the color channel of the target pixel under the remaining gamma bonding nodes and the target refresh frequency.

Figure 16:
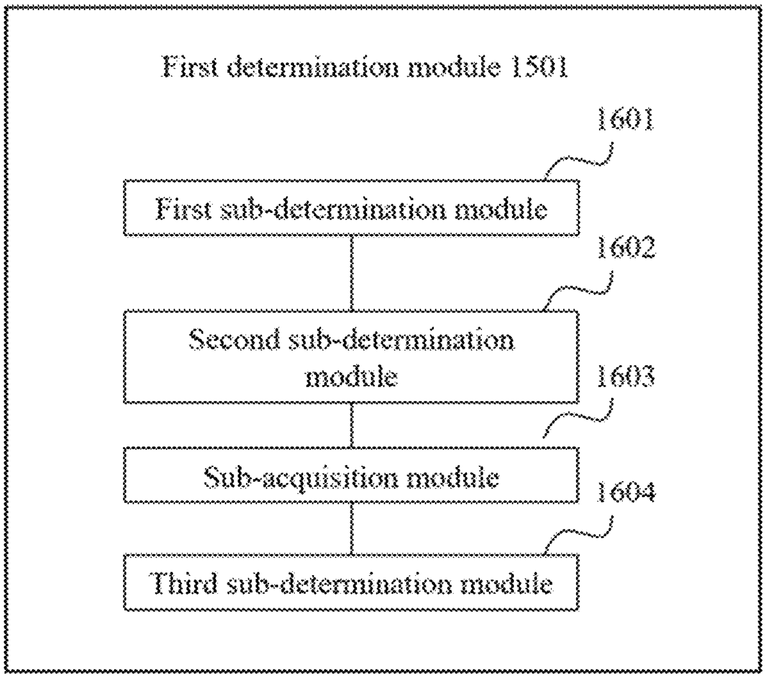
FIG. 16 illustrates an exemplary first determining module according to various disclosed embodiments of the present disclosure.

In some embodiments, as shown in FIG. 16, different gamma bonding nodes may be sorted according to size, and the first determination module 1501 may include:

- a first sub-determination module 1601, configured to, for each sample pixel in the sample screen and the pre-gamma bonding node and the post-gamma bonding node in each two adjacent initial gamma bonding nodes, using the difference value between the adjusted register value of the color channel of the sample pixel under the reference refresh frequency and the pre-gamma bonding node and the adjusted register value of the color channel of the sample pixel under the reference refresh frequency and the post-gamma bonding node as a corresponding first register difference value at the post-gamma bonding node;
- a second sub-determination module 1602 configured to use the difference between the adjusted register value of the color channel of the sample pixel under the target refresh frequency and the pre-gamma bonding node and the adjusted register value of the color channel of the sample pixel under the target refresh frequency and the post-gamma bonding node as the second register difference corresponding to the post-gamma bonding node;

a sub-acquisition module 1603 configured to obtain the register difference ratio corresponding to each initial gamma bonding node according to the first register difference value and the second register difference value corresponding to each initial gamma bonding node; and a third sub-determination module 1604 configured to determine at least one target gamma bonding node group according to the register difference ratio corresponding to each initial gamma bonding node.

Figure 17:
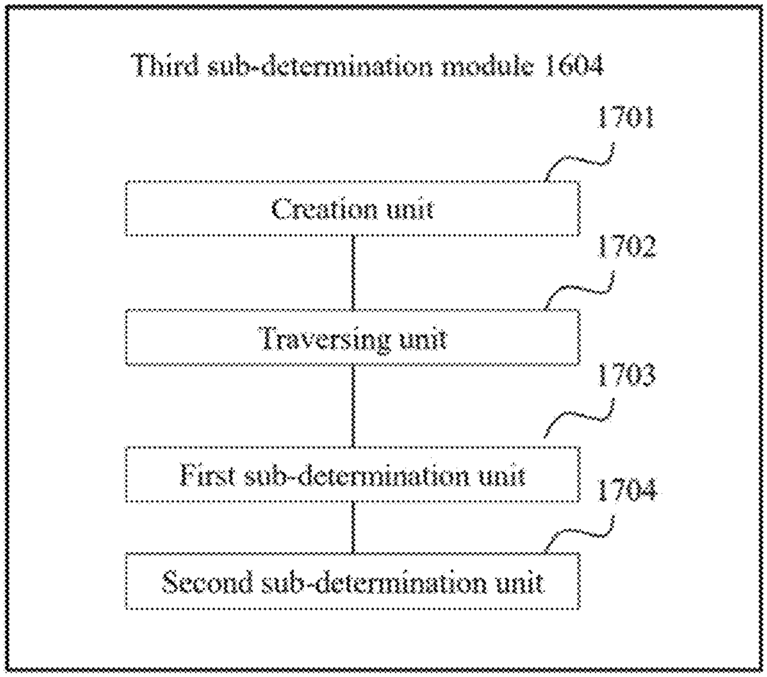
FIG. 17 illustrates an exemplary third sub-determination module according to various disclosed embodiments of the present disclosure.

In some embodiments, as shown in FIG. 17, the third sub-determination module 1604 may include:

a creation unit 1701 configured to create a new initial gamma bonding node group and add the corresponding initial gamma bonding nodes of the first register difference value in the register difference ratio sequence to the new initial gamma binding point group;

a traversing unit 1702 configured to sequentially traverse the register difference ratios in the register difference ratio sequence, and for the traversed current register difference ratios, when the difference between the current register difference ratio and the previous register difference ratio is within the preset range, add the initial gamma bonding node corresponding to the current register difference ratio to the new initial gamma bonding node group, and continue traversing until the register difference ratio sequence is traversed;

the first determination unit 1703 configured to determine the current register difference ratio and the subsequent register difference ratio as a new register difference ratio sequence when a difference between the current register difference ratio and the previous register difference ratio is not within the preset range, and return to the step of creating a new initial gamma bonding no group to continue; and a second determination unit 1704 configured to determine at least one target gamma bonding point group based on the obtained initial gamma bonding point group.

Figure 18:
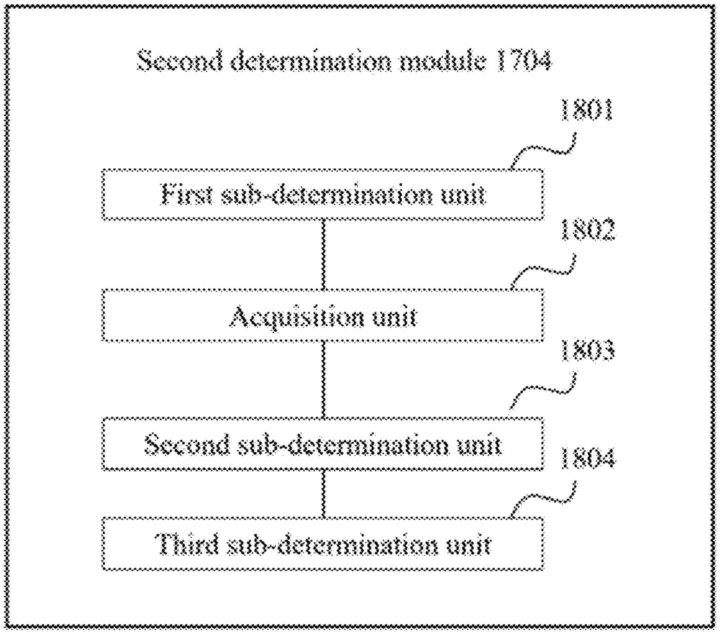
FIG. 18 illustrates an exemplary second determination module according to various disclosed embodiments of the present disclosure.

In some embodiments, as shown in FIG. 18, the second determination unit 1704 may include:

a first sub-determination unit 1801 configured to, for each initial gamma bonding node group, use the maximum initial gamma bonding node and the minimum initial gamma bonding node in the initial gamma bonding point group as the reference gamma bonding node.

a sub-acquisition unit 1802 configured to obtain, for each sample pixel in the sample screen and according to the corresponding adjusted register value of the color channel of the sample pixel under different second combined display conditions, a second mapping function between the register value corresponding to the color channel of the sample pixel when the reference refresh frequency is used as the display condition and the corresponding register value of the color channel of the sample pixel when the target refresh frequency is used as the display condition. The second combined display condition may be obtained by combining the reference gamma bonding node in the initial gamma bonding node group with the refresh frequencies in the reference refresh frequency and the target refresh frequency;

a second sub-determination unit 1803 configured to, for the remaining initial gamma bonding points in the initial gamma bonding point group except the reference gamma bonding node, determine the corresponding calculated register value of the color channel under the remaining initial gamma bonding nodes and the target refresh frequency according to the second mapping function and the corresponding adjusted register value of the color channel under the remaining initial gamma bonding node and the reference refresh frequency; and a third sub-determination unit 1804 configured to determine at least one target gamma bonding node group based on the calculated register value.

In some embodiments, the sub-acquisition unit 1802 may also be configured to determine the adjusted register value of the color channel of the sample pixel under the minimum reference gamma bonding node and the reference refresh frequency in the initial gamma bonding node group, and the adjusted register value of the color channel of the sample pixel under the minimum reference gamma bonding node and the target refresh frequency as the first coordinate in the coordinate system. The horizontal and vertical axes of the coordinate system may respectively represent the register value at the reference refresh frequency and the register value at the target refresh frequency. The sub-acquisition unit 1802 may also be configured to determine the adjusted register value of the color channel of the sample pixel under the maximum reference gamma bonding node in the initial gamma bonding node group and the reference refresh frequency and the adjusted register value of the color channel of the sample pixel under the maximum reference gamma bonding node and the target refresh frequency as the second coordinate in the coordinate system; and obtain the second mapping function between the corresponding register value of the color channel of the sample pixel when the reference refresh frequency is used as the display condition and the corresponding register value of the color channel of the sample pixel when the target refresh frequency is used as the display condition based on the curve fitting of the first coordinate and the second coordinate.

In some embodiments, the third sub-determination unit 1804 may also be used to obtain, for each sample pixel in the sample screen, the difference between the adjusted register value and the calculated register value of the color channel of the sample pixel under each remaining initial gamma bonding nodes and the target refresh frequency and determine the initial gamma bonding node group as the target gamma bonding node group when the difference between the adjusted register value and the calculated register value is within the second preset difference range.

In some embodiments, the third sub-determination unit 1804 may also be configured to determine the initial gamma bonding node in the initial gamma bonding node group as a new reference gamma bonding node to create a new initial gamma bonding node group when the corresponding difference between the adjusted register value and the calculated register value is not within the second preset difference range; determine the ordering of the different initial gamma bonding node group according to the number of initial gamma bonding nodes spaced between the two reference gamma bonding nodes; and in the order from large to small, sequentially for each initial gamma bonding node group, return the step for obtaining the second mapping function between the corresponding register value of the color channel of the sample pixel when the reference refresh frequency is used as the display condition and the corresponding register value of the color channel of the sample pixel when the target refresh frequency is used as the display condition according to the corresponding register value of the color channel of the sample pixel under different second combined display conditions and continue to execute until all the differences between the adjusted register value and the calculated register values are all within the second preset difference range.

In some embodiments, the acquisition module 1502 may further be configured to determine the adjusted register value of the color channel of the target pixel under the minimum gamma bonding node and the reference refresh frequency and the adjusted register value of the color channel of the target pixel under the minimum gamma bonding node and the target refresh frequency as the first coordinates in the coordinate system. The horizontal and vertical axes of the coordinate system may respectively represent the register value under the reference refresh frequency and the target refresh frequency; and obtain a first mapping function between the corresponding register value of the color channel when the reference fresh frequency is used as the display condition and the corresponding register value of the color channel of the target pixel when the target refresh frequency is used as the display condition based on the curve fitting of the first coordinate and the second coordinate.

In some embodiments, the second determination module 1503 may also be configured to, for the remaining gamma bonding nodes in the target gamma bonding node group, substitute the corresponding adjusted register value of the color channel of the target pixel under the remaining gamma bonding node and the reference refresh frequency into the first mapping function to obtain the corresponding calculated register value of the color channel of the target pixel at the remaining gamma bonding nodes and the target refresh frequency.

In some embodiments, the adjustment module 1504 may also be configured to send the corresponding calculated register value of the color channel of the target pixel under the remaining gamma bonding nodes and the target refresh frequency, and the corresponding adjusted register value of the color channel of the target pixel under the target gamma bonding node and the target refresh frequency to the integrated circuit of the target screen such that the integrated circuit may determine the grayscale register values of all remaining grayscales in the color channel except the gamma bonding nodes in the target gamma bonding node group based on the calculated register value and the adjusted register value; and adjust the display brightness of the target screen at the target refresh frequency based on the calculated register value, the adjusted register value and the grayscale register value.

Each module in the above-mentioned screen brightness adjustment device may be implemented in whole or in part by software, hardware, and combinations thereof. Each of the above modules may be embedded in or independent of the processor of the computer device in the form of hardware, or may be stored in the memory of the computer device in the form of software, such that the processor may call and execute the operations corresponding to the above modules.

Figure 19:
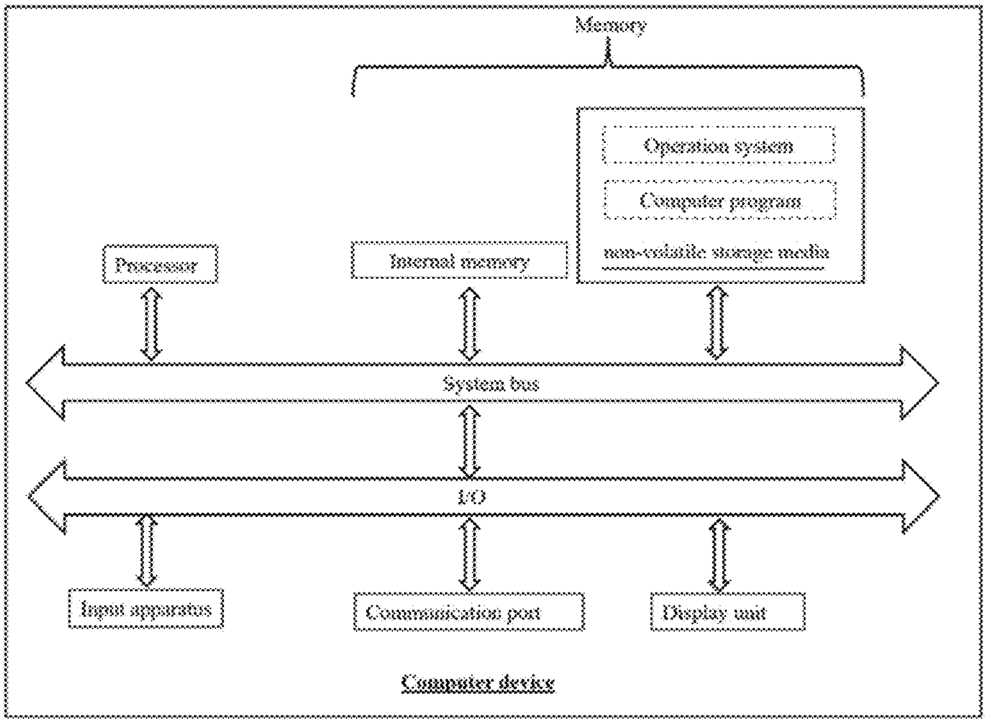
FIG. 19 illustrates an exemplary internal structure of a computer device according to various disclosed embodiments of the present disclosure.

The present disclosure also provides a computer device. The computer device may be a terminal, and its internal structure diagram may be as shown in FIG. 19. The computer device includes a processor, a memory, input/output interfaces, communication interfaces, display units and input devices. The processor, memory and input/output interfaces may be connected through the system bus, and the communication interface, display unit and input device may be connected to the system bus through the input/output interfaces. The processor of the computer device may be configured to provide computing and control capabilities. The memory of the computer device may include non-volatile storage media and internal memory. The non-volatile storage medium may store the operation systems and computer programs. The internal memory may provide an environment for the execution of operating systems and computer programs in non-volatile storage media. The input/output interface of the computer device may be used to exchange information between the processor and external devices. The communication interface of the computer device may be used for wired or wireless communication with external terminals. The wireless mode may be implemented through WIFI, mobile cellular network, near-field communication (NFC) or other technologies. The computer program may implement a screen brightness adjustment method when executed by a processor.

Those skilled in the art can understand that the structure shown in FIG. 19 may be only a block diagram of a partial structure related to the solution of the present disclosure, and does not constitute a limitation on the computer device to which the solution of the present disclosure is applied. The specific computer device may include more or fewer parts than shown, or combine certain parts, or have a different arrangement of parts.

In one embodiment, another computer device may also be provided. The computer device may include a memory and a processor. A computer program may be stored in the memory. When the processor executes the computer program, it may implement the steps in the above method embodiments.

It should be noted that the user information (including but not limited to user equipment information, user personal information, etc.) and data (including but not limited to data used for analysis, stored data, displayed data, etc.) involved in this disclosure may be all information and data authorized by the user or fully authorized by all parties, and the collection, use and processing of relevant data may need to comply with relevant regulations.

Those of ordinary skill in the art can understand that all or part of the processes in the methods of the above embodiments may be completed by instructing relevant hardware through a computer program. The computer program may be stored in a non-volatile computer-readable storage. When the computer program is executed, the computer program may include the processes of the above method embodiments. Any reference to memory, database or other media used in the embodiments provided in this disclosure may include at least one of non-volatile and volatile memory. The non-volatile memory may include read-only memory (ROM), magnetic tape, floppy disk, flash memory, optical memory, high-density embedded non-volatile memory, resistive memory (ReRAM), magnetic variable memory, magnetoresistive random access memory (MRAM), ferroelectric random access memory (FRAM), phase change memory (PCM), or graphene memory, etc. The volatile memory may include random access memory (RAM) or external cache memory, etc. As an illustration and not a limitation, RAM may be in various forms, such as static random access memory (SRAM) or dynamic random access memory (DRAM). The databases involved in the various embodiments provided in this disclosure may include at least one of a relational database and a non-relational database. The non-relational databases may include blockchain-based distributed databases, etc., but are not limited thereto. The processors involved in the various embodiments provided in this disclosure may be generalpurpose processors, central processing units, graphics processors, digital signal processors, programmable logic devices, or quantum computing-based data processing logic devices, etc., and are not limited to this.

The technical features of the above embodiments may be combined in any way. To simplify the description, not all possible combinations of the technical features in the above embodiments are described. However, as long as there is no contradiction in the combination of these technical features, all possible combinations should be used, it is considered to be within the scope described in this disclosure.

The above-described embodiments only express several implementation modes of the present disclosure, and their descriptions are relatively specific and detailed, but should not be construed as limiting the patent scope of the present disclosure. It should be noted that, for those of ordinary skill in the art, several modifications and improvements may be made without departing from the concept of the present disclosure, and these all fall within the protection scope of the present disclosure. Therefore, the scope of protection of this disclosure should be determined by the appended claims.

What is claimed is:

1. A method for adjusting brightness of a screen, comprising:

determining corresponding at least one target gamma bonding node group based on corresponding adjusted register values of a color channel of a sample pixel in a sample screen under different initial gamma bonding nodes and different refresh frequencies;

for each target pixel in a target to-be-adjusted target screen, according to the corresponding adjusted register value of the color channel of the target pixel under different first combined display conditions, obtaining a first mapping function between a corresponding register value of the color channel of the target pixel when a reference refresh frequency is used as a display condition and a corresponding register value of the color channel of the target pixel when a target refresh frequency is used as the display condition, wherein a first combined display condition is obtained by combining target gamma nodes in the at least one gamma bonding node group and refresh frequencies of the reference refresh frequency and the target refresh frequency;

for remaining gamma bonding nodes except the target gamma bonding nodes and according to the first mapping function and the adjusted register value of the color channel of the target pixel under the remaining gamma bonding nodes and the reference fresh frequency, determining a corresponding calculated register value of the color channel of the target pixel under the remaining gamma bonding nodes and the target refresh frequency; and according to the corresponding calculated register value of the color channel of the target pixel under the remaining gamma bonding nodes and the target refresh frequency, adjusting the display brightness of the target screen at the target refresh frequency.

2. The method according to claim 1, wherein different gamma bonding nodes are sorted according to sizes, determining the corresponding at least one target gamma bonding node group based on the corresponding adjusted register value of the color channel of the sample pixel in the sample screen under different initial gamma bonding nodes and different refresh frequencies comprises:

for each sample pixel in the sample screen and a pre-gamma bonding node and a post-gamma bonding node in each two adjacent initial gamma bonding nodes, determining a difference between an adjusted register value of the color channel of the target pixel under the reference refresh frequency and the pre-gamma bonding node and an adjusted register value of the color channel of the sample pixel under the reference refresh frequency and the post-gamma bonding node as a first register difference value corresponding to the post-gamma bonding node;

determining a difference between an adjusted register value of the color channel of the sample pixel under the target refresh frequency and the pre-gamma bonding node and an adjusted register value of the color channel of the sample pixel under the target refresh frequency and the post-gamma bonding node as a second register difference value corresponding to the post-gamma bonding node;

according to the first register difference value and the second register difference value corresponding to each initial gamma bonding node, obtaining a register difference ratio corresponding to each initial gamma bonding node; and according to the register difference ratio corresponding to each initial gamma bonding node, determining the at least one target gamma bonding node group.

3. The method according to claim 2, wherein determining the at least one target gamma bonding group according to the corresponding register value difference ratio corresponding to each initial gamma bonding node comprises:

for a register difference ratio sequence generated in order of a size of each initial gamma bonding node, creating a new initial gamma bonding node group, and adding an initial gamma bonding node corresponding to a first register difference ratio in the register difference ratio sequence to the new initial gamma bonding node group;

traversing register difference ratios in the register difference ratio sequence in sequence, for traversed current register difference ratios, adding an initial gamma bonding node corresponding to the current register difference ratio to the new initial gamma bonding node group when the difference between the current register difference ratio and a previous register difference ratio is within a preset range, and continuing traversing until the register difference ratio sequence is traversed;

when the difference between the current register difference ratio and the previous register difference ratio is not within the preset range, using the difference between the current register difference ratio and a subsequent register difference ratio as a new register difference ratio sequence, and returning to a step of creating the new initial gamma bonding node group to continue; and according to an obtained initial gamma bonding point group, determining the at least one target gamma bonding node group.

4. The method according to claim 3, wherein determining the at least one target gamma bonding node group according to the obtained initial gamma bonding node group comprises:

for each initial gamma bonding node group, using a maximum initial gamma bonding node and a minimum initial gamma bonding node in the initial gamma bonding node group as reference gamma bonding nodes;

for each sample pixel in the sample screen, according to a corresponding adjusted register value of the color channel of the sample pixel under different second combined display conditions, obtaining a second mapping function between a corresponding register value of the color channel of the sample pixel when the reference refresh frequency is used as the display condition and a corresponding register value of the color channel of the sample pixel when the target refresh frequency is used as the display condition, wherein the second combined display condition is obtained by combining the reference gamma bonding node in the initial gamma bonding node group and refresh frequencies in the reference refresh frequency and the target refresh frequency;

for remaining initial gamma bonding nodes in the initial gamma bonding node group except the reference gamma bonding node, according to the second mapping function and the corresponding adjusted register value of the color channel of the sample pixel under the remaining initial gamma bonding nodes and the reference refresh frequency, determining a corresponding calculated register value of the color channel of the sample pixel under the remaining initial gamma bonding nodes and the target refresh frequency; and based on the calculated register value, determining the at least one target gamma bonding node group.

5. The method according to claim 4, wherein obtaining the second mapping function between the corresponding register value of the color channel of the sample pixel when the reference fresh frequency is used as the display condition and the corresponding register value of the color channel of the sample pixel when the target refresh frequency is used as the display condition according to the corresponding register value of the color channel of the target sample under the second combined conditions comprises:

determining an adjusted register value of the color channel of the sample pixel under a minimum reference gamma bonding node and the reference refresh frequency in the initial gamma bonding node group and an adjusted register value of the color channel of the sample pixel under the minimum gamma bonding node and the target refresh frequency as a first coordinate in a coordinate system, wherein horizontal and vertical axes of the coordinate system respectively represent the register value at the reference refresh frequency and the target refresh frequency;

determining an adjusted register value of the color channel of the sample pixel under a maximum reference gamma bonding node and the reference refresh frequency in the initial gamma bonding node group and an adjusted register value of the color channel of the sample pixel under the maximum bonding node and the target refresh frequency as a second coordinate in the coordinate system; and performing a curve fitting based on the first coordinate and the second coordinate to obtain the second mapping function between the corresponding register value of the color channel of the sample pixel when the reference refresh frequency is used as the display condition and the register value of the color channel of the sample pixel when the target refresh frequency is used as the display condition.

6. The method according to claim 4, wherein determining the at least one target gamma bonding node group based the calculated register value comprises:

for each sample pixel in the sample screen, obtaining a difference between the adjusted register value and the calculated register value of the color channel of the sample pixel under each remaining initial gamma bonding node and the target refresh frequency; and when the difference between the adjusted register value and the calculated register value are both within a second preset difference range, determining the initial gamma bonding node group as the target gamma bonding node group.

7. The method according to claim 6, further comprising:

when the difference between the adjusted register value and the calculated register value is not within the second preset difference range, determining remaining initial gamma bonding nodes whose corresponding difference is not within the second preset difference range and the initial gamma bonding node in the initial gamma bonding node group as a new reference gamma bonding node to create a new initial gamma bonding node group; and according to a number of initial gamma bonding nodes between two reference gamma bonding nodes, determining an ordering between different initial gamma bonding node groups, in an order from largest to smallest, sequentially for each initial gamma bonding node group, returning to a step for obtaining, for each sample pixel of the sample screen, the second mapping function between the corresponding register value of the color channel of the sample pixel when the reference refresh frequency is used as the display condition and the corresponding register value of the color channel of the sample pixel when the target refresh frequency is used as the display condition according to the adjusted register value of the color channel under different second combined display conditions; and continuing to execute until the difference between the adjusted register value and the calculated register value is within the second preset difference range.

8. The method according to claim 1, wherein the target gamma bonding nodes are the minimum gamma bonding node and the maximum gamma bonding node in the target gamma bonding node group, obtaining the first mapping function between the corresponding register value of the color channel of the target pixel when the reference refresh frequency is used as the display condition and the corresponding register value of the color channel of the target pixel when the target refresh frequency is used as the display condition according to the corresponding adjusted register value of the color channel of the target pixel under different first combined display conditions comprises:

determining the adjusted register value of the color channel of the target pixel under the minimum gamma bonding node and the reference refresh frequency and the adjusted register value of the color channel of the target pixel under the minimum gamma bonding node and the target refresh frequency as a first coordinate in the coordinate system, wherein horizontal and vertical axes of the coordinate system respectively represent the register value at the reference refresh frequency and the register value at the target refresh frequency;

determining the adjusted register value of the color channel of the target pixel under the maximum gamma bonding node and the reference refresh frequency and the adjusted register value of the color channel of the target pixel under the maximum gamma bonding node and the target refresh frequency as a second coordinate in the coordinate system; and performing a curve fitting based on the first coordinate and the second coordinate to obtain the first mapping function between the corresponding register value of the color channel of the target pixel when the reference refresh frequency is used as the display condition and the corresponding register value of the color channel of the target pixel when the target refresh frequency is used as the display condition.

9. The method according to claim 1, wherein determining the corresponding calculated register value of the color channel of the target pixel under the remaining gamma bonding nodes and the reference refresh frequency according to the first mapping function and the corresponding adjusted register value of the color channel of the target pixel under the remaining gamma bonding nodes and the reference refresh frequency comprises:

for the remaining gamma bonding nodes in the target gamma bonding node group, substituting the corresponding adjusted register value of the color channel of the target pixel under the remaining gamma bonding nodes and the reference refresh frequency into the first mapping function to obtain the corresponding calculated register value of the color channel of the target pixel under the remaining gamma bonding nodes and the target refresh frequency by a calculation.

10. The method according to claim 9, wherein adjusting the display brightness of the target screen at the target refresh frequency according to the corresponding calculated register value of the color channel of the target pixel under the remaining gamma bonding nodes and the target refresh frequency comprises:

sending the corresponding calculated register value of the color channel of the target pixel under the remaining gamma bonding nodes and the target refresh frequency and the corresponding adjusted register value of the color channel of the target pixel under the target gamma bonding node and the target refresh frequency to an integrated circuit of the target screen such that the integrated circuit determines grayscale register values of all remaining grayscales under the remaining gamma bonding nodes except the gamma bonding nodes in the target gamma bonding node group based on the calculated register value and the adjusted register value; and based on the calculated register value, the adjusted register value and the grayscale register value, adjusting the display brightness of the target screen at the target refresh frequency.

11. An apparatus for adjusting brightness of a screen, comprising:

a first determination module configured to determine a corresponding at least one target gamma bonding node group based on a corresponding adjusted register value of a color channel of a sample pixel in the sample screen under different initial gamma bonding nodes and different refresh frequencies;

an acquisition module configured to acquire, for each target pixel in a target to-be-adjusted screen and according to the corresponding adjusted register value of the color channel of the target pixel under different first combined display conditions, a first mapping function between a corresponding register value of the color channel of the target pixel when a reference refresh frequency is used as a display condition and a corresponding register value of the color channel of the target pixel when a target refresh frequency is used as a display condition, wherein the first combined display condition is obtained by combining the target gamma bonding node in the gamma bonding node group and refresh frequencies in the reference refresh frequency and the target refresh frequency;

a second determination module configured to determine, for remaining gamma bonding nodes except the target gamma bonding node and according to the first mapping function and the corresponding adjusted register value of the color channel of the target pixel under the remaining gamma bonding nodes and the reference refresh frequency, a corresponding calculated register value of the color channel of the target pixel under the remaining gamma bonding nodes and the target refresh frequency; and an adjustment module configured to adjust the display brightness of the target screen at the target refresh frequency according to the corresponding calculated register value of the color channel of the target pixel under the remaining gamma bonding nodes and the target refresh frequency.

12. The apparatus according to claim 11, wherein different gamma bonding nodes are sorted by sizes, and the first determination module comprises:

a first sub-determination module configured to, for each sample pixel in the sample screen and a pre-gamma bonding node and a post-gamma bonding node in each two adjacent initial gamma bonding nodes, determine a difference between the adjusted register value of the color channel of the sample pixel under the reference refresh frequency and the pre-gamma bonding node and the adjusted register value of the color channel of the sample pixel under the reference refresh frequency and the post-gamma bonding node as a first register difference value corresponding to the post-gamma bonding node;

a second sub-determination module configured to determine a difference between the adjusted register value of the color channel of the sample pixel under the target refresh frequency and the pre-gamma bonding node and the adjusted register value of the color channel of the sample pixel under the target refresh frequency and the post-gamma bonding node as a second register difference value corresponding to the post-gamma bonding node;

a sub-acquisition module configured to obtain a register difference ratio corresponding to each initial gamma bonding node according to the first register difference value and the second register difference value corresponding to each initial gamma bonding node; and a third sub-determination module configured to determine at least one target gamma bonding node group based on the register difference ratio corresponding to each initial gamma bonding node.

13. The apparatus according to claim 12, wherein the third sub-determination module comprises:

a creation unit configured to create a new initial gamma bonding node group for a register difference ratio sequence generated according to a size order of each initial gamma boding node, and add an initial gamma bonding node corresponding to a first register difference ratio in the register difference ratio sequence to the new initial gamma bonding node group;

a traversing unit configured to sequentially traverse register difference ratios in the register difference ratio sequence, and for t traversed current register difference ratios and when the difference between a current register difference ratio and a previous register difference ratio is within a preset range, add an initial gamma bonding node corresponding to the current register difference ratio to the new initial gamma bonding node group, and continue traversing until the register difference ratio sequence is traversed;

a first determination unit configured to use a current register difference ratio and a subsequent register difference ratio as a new register difference ratio when a difference between the current register difference ratio and the previous register difference ratio is not within a preset range; and return to a step of creating the new initial gamma bonding node group to continue execution; and a second determination unit configured to determine the at least one target gamma bonding node group based on the obtained initial gamma bonding node group.

14. The apparatus according to claim 13, wherein the second determination unit comprises:

a first sub-determination unit configured to, for each initial gamma bonding node group, determine a maximum initial gamma bonding node and a minimum initial gamma bonding node in the initial gamma bonding node group as reference gamma bonding nodes;

a sub-acquisition unit configured to, for each sample pixel in the sample screen and according to the corresponding adjusted register value of the color channel of the sample pixel under different second combined display conditions, to obtain a second mapping function between the corresponding register value of the color channel of the sample pixel when the reference refresh frequency is used as the display condition and the corresponding register value of the color channel of the sample pixel value when the target refresh frequency is used as the display condition, wherein the second combined display condition is obtained by combining the reference gamma bonding node in the gamma bonding node group and refresh frequencies in the reference refresh frequency and the target refresh frequency;

a second sub-determination unit configured to determine, for the remaining initial gamma bonding nodes in the initial gamma bonding node group except the reference gamma bonding node and according to the second mapping function and the corresponding adjusted register value of the color channel under the remaining initial gamma bonding node and the reference refresh frequency, determine the corresponding calculated register value of the color channel of the sample pixel under the remaining initial gamma bonding nodes and the target refresh frequency; and a third sub-determination unit configured to determine the at least one target gamma bonding node group based on the calculated register value.

15. A computer device, comprising:

a memory configured to store computer program; and a processor configured to execute the computer program to:

determine corresponding at least one target gamma bonding node group based on corresponding adjusted register values of a color channel of a sample pixel in a sample screen under different initial gamma bonding nodes and different refresh frequencies;

for each target pixel in a target to-be-adjusted target screen, according to the corresponding adjusted register value of the color channel of the target pixel under different first combined display conditions, obtain a first mapping function between a corresponding register value of the color channel of the target pixel when a reference refresh frequency is used as a display condition and a corresponding register value of the color channel of the target pixel when a target refresh frequency is used as the display condition, wherein a first combined display condition is obtained by combining target gamma nodes in the at least one gamma bonding node group and refresh frequencies of the reference refresh frequency and the target refresh frequency;

for remaining gamma bonding nodes except the target gamma bonding nodes and according to the first mapping function and the adjusted register value of the color channel of the target pixel under the remaining gamma bonding nodes and the reference fresh frequency, determined a corresponding calculated register value of the color channel of the target pixel under the remaining gamma bonding nodes and the target refresh frequency; and according to the corresponding calculated register value of the color channel of the target pixel under the remaining gamma bonding nodes and the target refresh frequency, adjust a display brightness of the target screen at the target refresh frequency.

* * * * *